(12) United States Patent
Okamura et al.

(10) Patent No.: US 8,387,732 B2
(45) Date of Patent: Mar. 5, 2013

(54) POWER OUTPUT APPARATUS, METHOD OF CONTROLLING THE SAME, AND VEHICLE

(75) Inventors: Masaki Okamura, Toyota (JP); Kazuhito Hayashi, Inazawa (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 867 days.

(21) Appl. No.: 12/486,868

(22) Filed: Jun. 18, 2009

(65) Prior Publication Data

US 2009/0314564 A1 Dec. 24, 2009

(30) Foreign Application Priority Data

Jun. 18, 2008 (JP) ................................ 2008-159361

(51) Int. Cl.
*B60W 10/08* (2006.01)
(52) U.S. Cl. .............................. 180/65.285; 180/65.275
(58) Field of Classification Search ................. 180/65.1, 180/65.275, 65.285
See application file for complete search history.

(56) References Cited

U.S. PATENT DOCUMENTS

| | | | | |
|---|---|---|---|---|
| 5,903,113 | A * | 5/1999 | Yamada et al. ................. | 318/10 |
| 6,950,739 | B2 * | 9/2005 | Matsubara et al. ........... | 701/103 |
| 7,023,150 | B2 * | 4/2006 | Hisada et al. .................. | 318/34 |
| 7,163,072 | B2 * | 1/2007 | Yamaguchi ................ | 180/65.24 |
| 7,202,625 | B2 * | 4/2007 | Adra et al. .................... | 318/701 |
| 8,215,425 | B2 * | 7/2012 | Hayashi et al. .......... | 180/65.265 |
| 2002/0040264 | A1 * | 4/2002 | Inoue .............................. | 701/22 |
| 2004/0129465 | A1 * | 7/2004 | Yamaguchi ................... | 180/65.2 |
| 2005/0075766 | A1 * | 4/2005 | Kobayashi et al. ............. | 701/22 |
| 2009/0025992 | A1 | 1/2009 | Hayashi et al. | |
| 2009/0146589 | A1 * | 6/2009 | Hattori et al. ............. | 318/400.02 |
| 2009/0251083 | A1 * | 10/2009 | Kinpara et al. .......... | 318/400.11 |
| 2009/0295316 | A1 * | 12/2009 | Patel et al. ................ | 318/400.02 |
| 2010/0045219 | A1 * | 2/2010 | Ajima et al. ............. | 318/400.04 |
| 2011/0290573 | A1 * | 12/2011 | Hanada .................... | 180/65.285 |

FOREIGN PATENT DOCUMENTS

| | | |
|---|---|---|
| JP | 07322683 A | 12/1995 |
| JP | 07322683 A | 12/1995 |
| JP | 08275571 A | 10/1996 |
| JP | 08275571 A | 10/1996 |
| JP | 2002374689 A | 12/2002 |
| JP | 2002374689 A | 12/2002 |
| JP | 2007261562 | 10/2007 |
| JP | 2007313941 A | 12/2007 |
| JP | 2007313941 A | 12/2007 |
| WO | WO-2007099879 A1 | 9/2007 |

* cited by examiner

*Primary Examiner* — J. Allen Shriver, II
*Assistant Examiner* — Travis Coolman
(74) *Attorney, Agent, or Firm* — Gifford, Krass, Sprinkle, Anderson & Citkowski, P.C.

(57) ABSTRACT

A power output apparatus including a power source, an electric motor and a connecting and disconnecting device, and a method of controlling the power output apparatus, are provided. When load driving force is applied from the power source to a power shaft in a condition where the power shaft and a driveshaft are disconnected from each other by the connecting and disconnecting device, lock control is executed to control the motor by fixing a direction of a magnetic field of a stator so as to restrict rotation of a rotor. When the rotor rotates during execution of the lock control, rotation retardation control is executed to control the motor by rotating the direction of the stator magnetic field in accordance with rotation of the rotor, so that driving force is applied from the motor to the power shaft in a direction opposite to that of the load driving force as driving force applied from the power source to the power shaft.

19 Claims, 14 Drawing Sheets

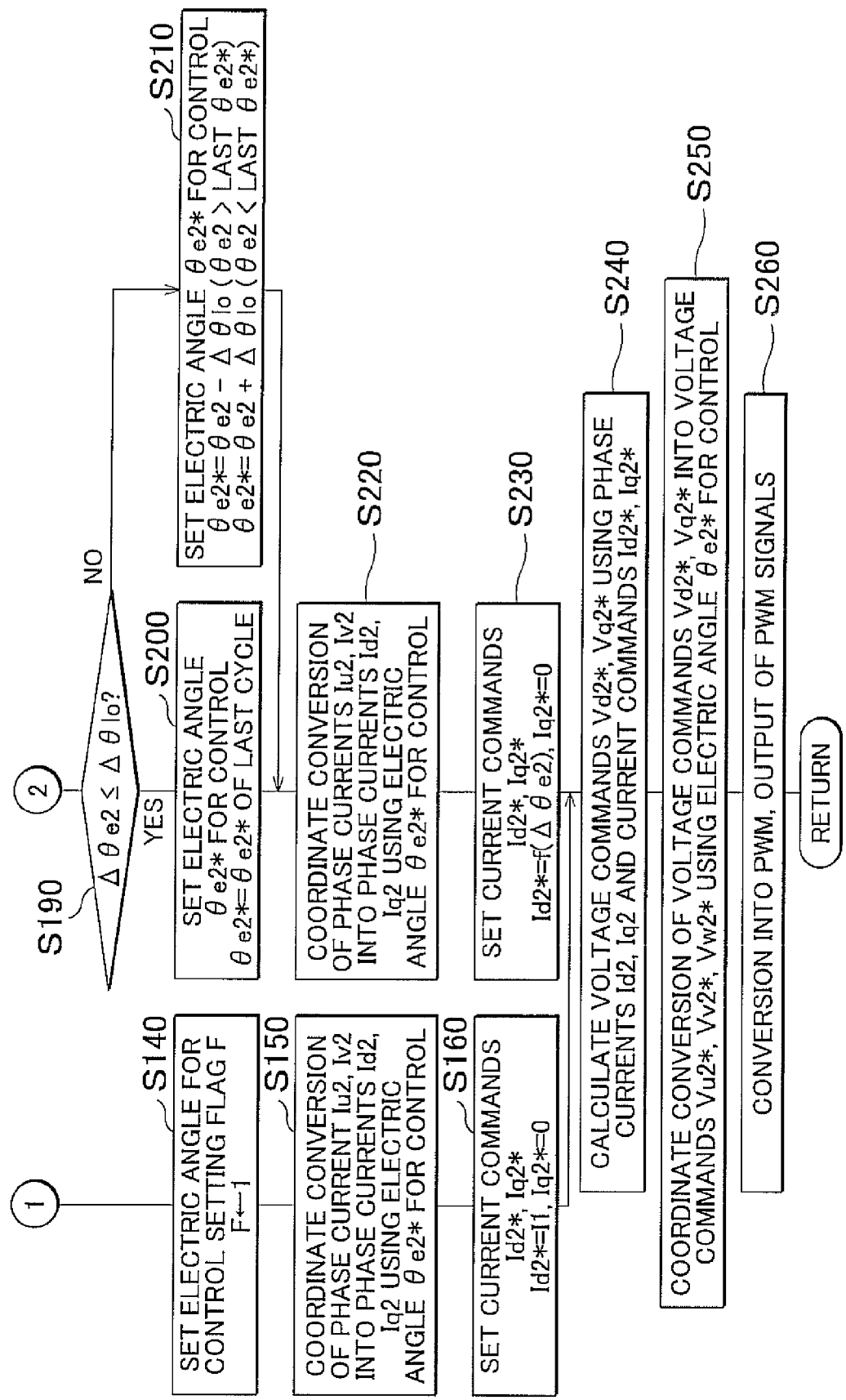

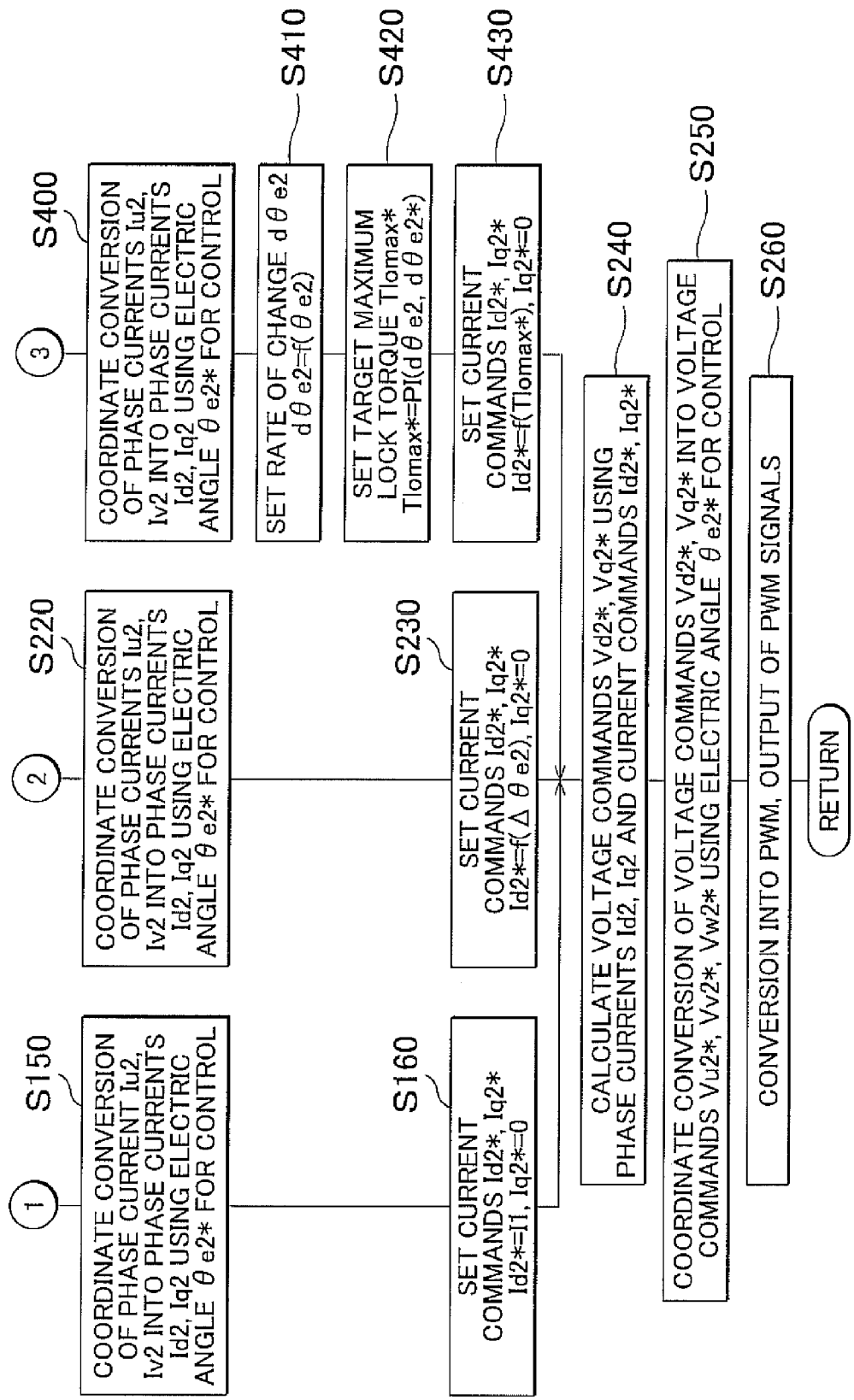

POWER OUTPUT APPARATUS, METHOD OF CONTROLLING THE SAME, AND VEHICLE

INCORPORATION BY REFERENCE

The disclosure of Japanese Patent Application No. 2008-159361 filed on Jun. 18, 2008, including the specification, drawings and abstract, is incorporated herein by reference in its entirety.

BACKGROUND OF THE INVENTION

1. Field of the Invention

The invention relates to a power output apparatus, a method of controlling the power output apparatus, and a vehicle on which the power output apparatus is installed.

2. Description of the Related Art

A conventional power output apparatus installed on a vehicle includes an engine, a planetary gear mechanism connected to a crankshaft of the engine and also connected to a rotary shaft, a first motor (MG1) connected to the planetary gear mechanism, a second motor (MG2) connected to the rotary shaft, and a transmission that transmits power from the rotary shaft to driving wheels while changing the rotational speed (as described in, for example, Japanese Patent Application Publication No. 2007-261562 (JP-A-2007-261562)). In the power output apparatus, when the engine is started while the rotary shaft is disconnected from the driving wheels via the transmission, the motor is controlled so that a given current passes through the d axis at a start-time electric angle as an electric angle used when fixing the direction of a magnetic field formed by a stator of the motor MG2. As a result, torque (torque of attraction) corresponding to a difference between the start-time electric angle and the current electric angle is applied to the rotary shaft, and the rotor is stopped at a position where the torque of attraction and torque (applied torque) generated from the motor MG1 and applied to the motor MG1 are balanced with each other, so that the engine can be started by motoring even in a condition where the rotary shaft is disconnected from the driving wheels.

In the power output apparatus as described above, when the given current is passed through the d axis at the start-time electric angle, the rotor may rotate if the applied torque is larger than the maximum torque (the maximum value of the torque of attraction) that can restrict or inhibit rotation of the rotor with the given current. In this case, too, it is desirable to curb or prevent rotation of the rotor to the extent possible.

SUMMARY OF THE INVENTION

In view of the above-described situation, the present invention provides a power output apparatus, a method of controlling the power output apparatus, and a vehicle equipped with the power output apparatus, which reduces the amount of increase in the rotational speed of a rotor of an electric motor, when the rotor rotates during execution of the lock control for controlling the electric motor by fixing the direction of a stator magnetic field as a magnetic field of a stator so as to restrict or inhibit rotation of the rotor.

According to one aspect of the invention, a power output apparatus adapted to drive a driveshaft is provided which includes: a power source that delivers power to a power shaft, an electric motor that has a rotor to which the power shaft is connected and a stator that produces a rotating magnetic field, the rotor being rotated by the rotating magnetic field of the stator so that the electric motor delivers and receives power to and from the power shaft, a connecting and disconnecting device that connects the power shaft and the driveshaft with each other and disconnects the power shaft and the driveshaft from each other, and a controller that executes lock control for controlling the electric motor by fixing a direction of a stator magnetic field as a magnetic field of the stator so as to restrict rotation of the rotor, when a driving force is applied from the power source to the power shaft in a condition where the power shaft and the driveshaft are disconnected from each other by the connecting and disconnecting device. In the power output apparatus, when the rotor rotates during execution of the lock control, the controller executes rotation retardation control for controlling the electric motor by rotating the direction of the stator magnetic field in accordance with rotation of the rotor, so that a driving force is applied from the electric motor to the power shaft in a direction opposite to that of a load driving force as the driving force applied from the power source to the power shaft.

In the power output apparatus according to the above aspect of the invention, when driving force is applied from the power source to the power shaft in a condition where the power shaft and the drive shaft are disconnected from each other by the connecting and disconnecting device, the controller executes the lock control for controlling the electric motor by fixing the direction of the stator magnetic field as the magnetic field of the stator so as to restrict or inhibit rotation of the rotor. When the rotor rotates during execution of the lock control, the controller executes the rotation retardation control for controlling the electric motor by rotating the direction of the stator magnetic field in accordance with the rotation of the rotor so that driving force is applied from the electric motor to the power shaft in the direction opposite to the load driving force as the driving force applied from the power source to the power shaft. Thus, when the rotor rotates during execution of the lock control, the amount of increase in the rotational speed of the rotor (the power shaft) can be reduced by rotating the direction of the stator magnetic field in accordance with the rotation of the rotor, and applying driving force from the electric motor to the power shaft in the direction opposite to the load driving force.

In the power output apparatus of the invention as described above, the electric motor may include permanent magnets mounted to the rotor, and, when the load driving force is applied in the condition where the power shaft and the driveshaft are disconnected from each other, the controller may execute the lock control when a directional difference as a magnitude of a displacement between the direction of the stator magnetic field and a direction of a magnet-derived magnetic flux formed by the permanent magnets is equal to or smaller than a first predetermined difference, and may execute the rotation retardation control when the directional difference becomes larger than the first predetermined difference during execution of the lock control. The "first predetermined difference" may be the magnitude of a displacement between the direction of the stator magnetic field when the lock control is executed, and the direction of the magnet-derived magnetic flux when the absolute value of the driving force applied from the electric motor to the power shaft is maximized, or may be a difference that becomes larger as current that passes through the electric motor increases.

In the power output apparatus in which the rotation retardation control is executed when the directional difference becomes larger than the first predetermined difference during execution of the lock control, the controller may control the electric motor during execution of the rotation retardation control so that the direction of the stator magnetic field is displaced by the first predetermined difference from the direction of the magnet-derived magnetic flux. If the current applied to the electric motor is made constant after the directional difference becomes larger than the first predetermined difference, a substantially constant driving force is applied from the electric motor to the power shaft, and the amount of increase in the rotational speed of the rotor (the power shaft) can be reduced.

In the power output apparatus in which the rotation retardation control is executed when the directional difference becomes larger than the first predetermined difference during execution of the lock control, the controller may control the electric motor during execution of the lock control, so that the stator magnetic field formed when the directional difference is equal to or smaller than the first predetermined difference and is larger than a second predetermined difference that is smaller than the first predetermined difference has a greater strength than the stator magnetic field formed when the directional difference is equal to or smaller than the second predetermined difference. The controller may also control the electric motor during execution of the lock control, so that the stator magnetic field formed when there is a possibility that the directional difference becomes larger than the first predetermined difference has a greater strength than that formed when there is no possibility that the directional difference becomes larger than the first predetermined difference. The controller may also control the electric motor during execution of the lock control so that the strength of the stator magnetic field increases as the directional difference increases. The controller may also control the electric motor during execution of the lock control so that the strength of the stator magnetic field increases as the magnitude of the load driving force increases. In these cases, the directional difference is less likely to become larger than the first predetermined difference. Namely, the lock control can be continued for a prolonged time.

In the power output apparatus of the above forms of the invention, the strength of the stator magnetic field may increase as a motor current as a current that passes through the electric motor increases, and the controller may set a target current to be passed through the electric motor, using a relationship that an allowable time as a length of time for which the motor current is allowed to continuously pass through the electric motor decreases with increase in the motor current, and control the electric motor using the set target current. With this arrangement, generation of heat in the electric motor, and the like, can be curbed.

In the power output apparatus of the invention in which the rotation retardation control is executed when the directional difference becomes larger than the first predetermined difference during execution of the lock control, the controller may set an electric angle for control to a constant electric angle during execution of the lock control, set the electric angle for control based on an electric angle of the rotor and the predetermined difference during execution of the rotation retardation control, and may control the electric motor, using the set electric angle for control.

The power output apparatus of the invention in which the electric motor is controlled using the electric angle for control may further include an electric angle detecting unit that detects an electric angle of the rotor, and an estimated electric angle setting unit that sets an estimated electric angle as an estimated value of the electric angle of the rotor during control, based on the detected electric angle, and the controller may set the electric angle for control, using the detected electric angle or the estimated electric angle, when the rotation retardation control is executed. With this arrangement, the electric angle for control can be set more appropriately.

In the power output apparatus of the invention in which the electric motor is controlled using the electric angle for control, the electric motor may be a synchronous motor-generator that is controlled using 3-phase to 2-phase conversion and 2-phase to 3-phase conversion, and, when the lock control and the rotation retardation control are executed, the controller may set a d-axis current command for a d-axis current obtained through the 3-phase to 2-phase conversion using the electric angle for control, to a given current, while setting a q-axis current command to value 0, and may control the electric motor based on the set d-axis and q-axis current commands. In this case, when the rotor rotates and a rotational speed of the rotor exceeds a first predetermined rotational speed during execution of the lock control, the controller may set a drive command of the electric motor, set the electric angle for control to the electric angle of the rotor, set a d-axis current command and a q-axis current command for d-axis current and q-axis current obtained through the 3-phase to 2-phase conversion using the set electric angle for control, based on the set drive command of the electric motor, and may control the electric motor based on the set d-axis and q-axis current commands. The "drive command of the electric motor" may be a command that is set so that the rotational speed of the rotor becomes equal to or lower than the first predetermined rotational speed. With the above arrangement, the amount of increase in the rotational speed of the rotor can be further reduced.

In the power output apparatus of the invention, when the rotor rotates during execution of the lock control, the controller may control the electric motor under the rotation retardation control so that the strength of the magnetic field of the stator becomes greater than that detected during execution of the lock control, and/or may control the power source so that the load driving force becomes smaller than that detected during execution of the lock control. With this arrangement, the amount of increase in the rotational speed of the rotor (the power shaft) can be further reduced.

In the power output apparatus of the invention, when the rotor rotates during execution of the lock control, the controller may control the electric motor under the rotation retardation control so that the rotational speed of the electric motor becomes equal to a second predetermined rotational speed. The "predetermined rotational speed" may be a rotational speed at which the motor rotates such that a length of time for which current continuously passes through each phase of the electric motor and the inverter that drives the motor by switching control of a plurality of switching devices is held within a range in which the motor and the inverter can be thermally protected. With this arrangement, current is prevented from continuously passing through a particular phase of the motor and inverter for an undesirably prolonged period of time, and the amount of increase in the temperatures of the motor and inverter can be reduced. In the power output apparatus of this embodiment of the invention, when the rotor rotates during execution of the lock control and when a motor system including the electric motor is brought into a specified condition during execution of the lock control, the controller may control the electric motor so that the rotational speed of the electric motor becomes equal to the second predetermined rotational speed. The "motor system" includes a drive circuit that drives the electric motor, and so forth, as well as the electric motor. The "predetermined condition" may be a condition in which the temperature of the motor system is higher than a predetermined temperature.

In the power output apparatus of the invention, the power source may include an internal combustion engine, a generator operable to generate and receive power, and a three-shafttype power input/output device that is connected to three shafts comprising the driveshaft, an output shaft of the internal combustion engine, and a rotary shaft of the generator, and delivers and receives power to and from one of the three shafts, based on power received from or delivered to the remaining two shafts. The "three-shaft-type power input/output device" may be a single-pinion type or double-pinion type planetary gear mechanism, or may be a differential gear.

In the power output apparatus of the invention, the connecting and disconnecting device may be a shifting device operable to transmit power while changing a speed ratio between the power shaft and the driveshaft, and to inhibit power from being transmitted between the power shaft and the driveshaft.

According to another aspect of the invention, there is provided a vehicle on which the power output apparatus according to any of the above forms of the invention is installed, and which has an axle(s) coupled to the driveshaft. Namely, the vehicle is equipped with the power output apparatus adapted to drive a driveshaft, which includes: a power source that delivers power to a power shaft, an electric motor that has a rotor to which the power shaft is connected and a stator that produces a rotating magnetic field, the rotor being rotated by the rotating magnetic field of the stator so that the electric motor delivers and receives power to and from the power shaft, a connecting and disconnecting device that connects the power shaft and the driveshaft with each other and disconnects the power shaft and the driveshaft from each other, and a controller that executes lock control for controlling the electric motor by fixing a direction of a stator magnetic field as a magnetic field of the stator so as to restrict rotation of the rotor, when a driving force is applied from the power source to the power shaft in a condition where the power shaft and the driveshaft are disconnected from each other by the connecting and disconnecting device. In the power output apparatus, when the rotor rotates during execution of the lock control, the controller executes rotation retardation control for controlling the electric motor by rotating the direction of the stator magnetic field in accordance with rotation of the rotor, so that a driving force is applied from the electric motor to the power shaft in a direction opposite to that of a load driving force as the driving force applied from the power source to the power shaft.

The vehicle of the invention, which is equipped with the power output apparatus according to any of the above-described forms of the invention, yields advantageous effects similar to those provided by the power output apparatus of the invention, for example, an effect of reducing the amount of increase in the rotational speed of the rotor when the rotor rotates during execution of the lock control.

According to a further aspect of the invention, there is provided a method of controlling a power output apparatus which includes a power source that delivers power to a power shaft, an electric motor that has a rotor to which the power shaft is connected and a stator that produces a rotating magnetic field, the rotor being rotated by the rotating magnetic field of the stator so that the electric motor delivers and receives power to and from the power shaft, and a connecting and disconnecting device that connects the power shaft and a driveshaft with each other and disconnects the power shaft and the driveshaft from each other. The method includes the steps of: executing lock control for controlling the electric motor by fixing a direction of a stator magnetic field as a magnetic field of the stator so as to restrict rotation of the rotor, when a driving force is applied from the power source to the power shaft in a condition where the power shaft and the driveshaft are disconnected from each other by the connecting and disconnecting device, and executing rotation retardation control when the rotor rotates during execution of the lock control, for controlling the electric motor by rotating the direction of the stator magnetic field in accordance with rotation of the rotor, so that a driving force is applied from the electric motor to the power shaft in a direction opposite to that of a load driving force as the driving force applied from the power source to the power shaft.

According to the method of controlling the power output apparatus as described above, when driving force is applied from the power source to the power shaft in a condition where the power shaft and the drive shaft are disconnected from each other by the connecting and disconnecting device, the lock control is executed to control the electric motor by fixing the direction of the stator magnetic field as the magnetic field of the stator so as to restrict or inhibit rotation of the rotor. When the rotor rotates during execution of the lock control, the rotation retardation control is executed to control the electric motor by rotating the direction of the stator magnetic field in accordance with the rotation of the rotor so that driving force is applied from the electric motor to the power shaft in the direction opposite to the load driving force as the driving force applied from the power source to the power shaft. Thus, when the rotor rotates during execution of the lock control, the amount of increase in the rotational speed of the rotor (the power shaft) can be reduced by rotating the direction of the stator magnetic field in accordance with the rotation of the rotor, and applying driving force from the electric motor to the power shaft in the direction opposite to the load driving force.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIGS. 5A and 5B are flowcharts illustrating one example of motor control routine executed by a motor ECU of the power output apparatus of the first embodiment when load torque is applied during parking;

FIGS. 14A and 14B are flowcharts illustrating one example of motor control routine executed by a motor ECU of a power output apparatus according to a third embodiment of the invention when load torque is applied during parking.

DETAILED DESCRIPTION OF EMBODIMENTS

The present invention will be described in detail with reference to preferred embodiments thereof.

Figure 1:
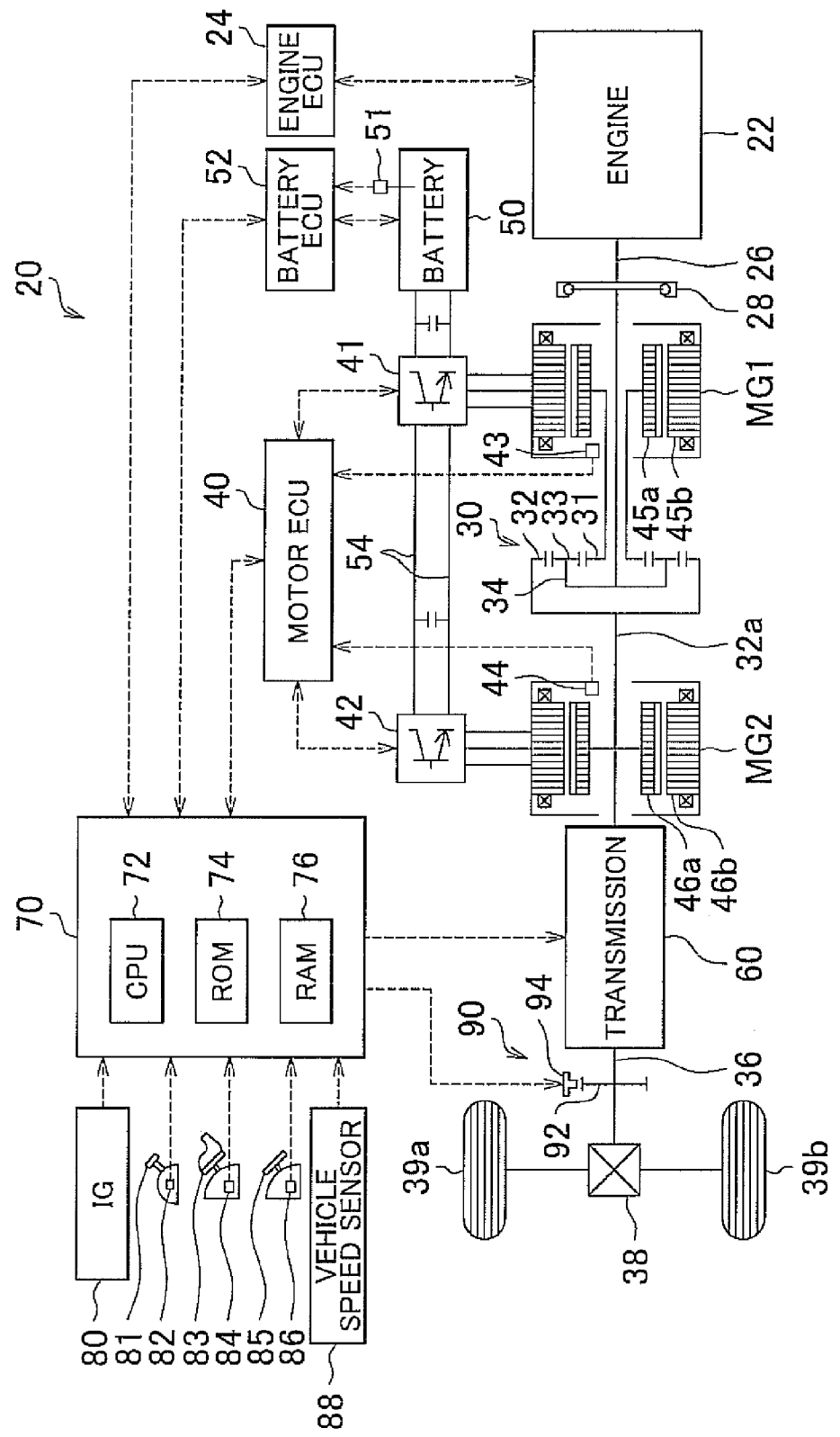
FIG. 1 is a view schematically showing the construction of a hybrid vehicle equipped with a power output apparatus according to a first embodiment of the invention.

FIG. 1 schematically illustrates the construction of a hybrid vehicle 20 on which a power output apparatus according to a first embodiment of the invention is installed. As shown in FIG. 1, the hybrid vehicle 20 of the first embodiment includes an engine 22, a three-shaft-type power distribution/integration mechanism 30 connected to a crankshaft 26 as an output shaft of the engine 22 via a damper 28, a motor MG1 capable of generating electric power and connected to the power distribution/integration mechanism 30, a motor MG2 connected to a ring gear shaft 32a connected to the power distribution/integration mechanism 30, a transmission 60 operable to transmit power from the ring gear shaft 32a to a driveshaft 36 coupled to driving wheels 39a, 39b while changing the speed of the ring gear shaft 32a into that of the driveshaft 36, a parking lock mechanism 90 operable to lock the driving wheels 39a, 39b, and a hybrid-system electronic control unit 70 for controlling the hybrid vehicle as a whole. In the first embodiment, the engine 22, power distribution/integration mechanism 30 and the motor MG1 correspond to a power source.

The engine 22 is an internal combustion engine that generates power with a hydrocarbon-base fuel, such as gasoline or light oil, and its operations are controlled by an electronic control unit for the engine (which will be called "engine ECU") 24. For example, the engine 22 is subjected to fuel injection control, ignition control, intake air amount control, etc. The engine ECU 24 receives signals from various sensors for detecting operating conditions of the engine 22, for example, a crankshaft position from a crankshaft position sensor (not shown) for detecting the crank angle of the crankshaft 26 of the engine 22. The engine ECU 24 communicates with the hybrid-system electronic control unit 70, and controls the operation of the engine 22 according to a control signal from the hybrid-system electronic control unit 70 while transmitting data concerning operating conditions of the engine 22 to the hybrid-system electronic control unit 70 as needed. The engine ECU 24 calculates the rotational speed of the crankshaft 26, i.e., the rotational speed Ne of the engine 22, based on the crankshaft position received from the crankshaft position sensor.

The power distribution/integration mechanism 30 is in the form of a planetary gear mechanism that includes a sun gear 31 as an external gear, a ring gear 32 as an internal gear disposed concentrically with the sun gear 31, a plurality of pinion gears 33 that mesh with the sun gear 31 and also mesh with the ring gear 32, and a carrier 34 that holds the pinion gears 33 such that the pinion gears 33 can rotate about themselves and about the same axis. The sun gear 31, ring gear 32 and the carrier 34, as rotary elements of the power distribution/integration mechanism 30, may rotate at different speeds in different directions. In the power distribution/integration mechanism 30, the crankshaft 26 of the engine 22 is coupled to the carrier 34, and the motor MG1 is coupled to the sun gear 31, while the ring gear shaft 32a as the input shaft of the transmission 60 is coupled to the ring gear 32. When the motor MG1 operates as a generator, power transmitted from the engine 22 to the carrier 34 is distributed to the sun gear 31 side and the ring gear 32 side according to the gear ratio thereof. When the motor MG1 operates as an electric motor, power transmitted from the engine 22 to the carrier 34 and power transmitted from the motor MG1 to the sun gear 31 are combined or integrated, and delivered to the ring gear 32 side. The power delivered to the ring gear 32 is eventually transmitted to the driving wheels 39a, 39b of the vehicle, via the ring gear shaft 32a, transmission 60, driveshaft 36 and a differential gear 38.

Figure 2:
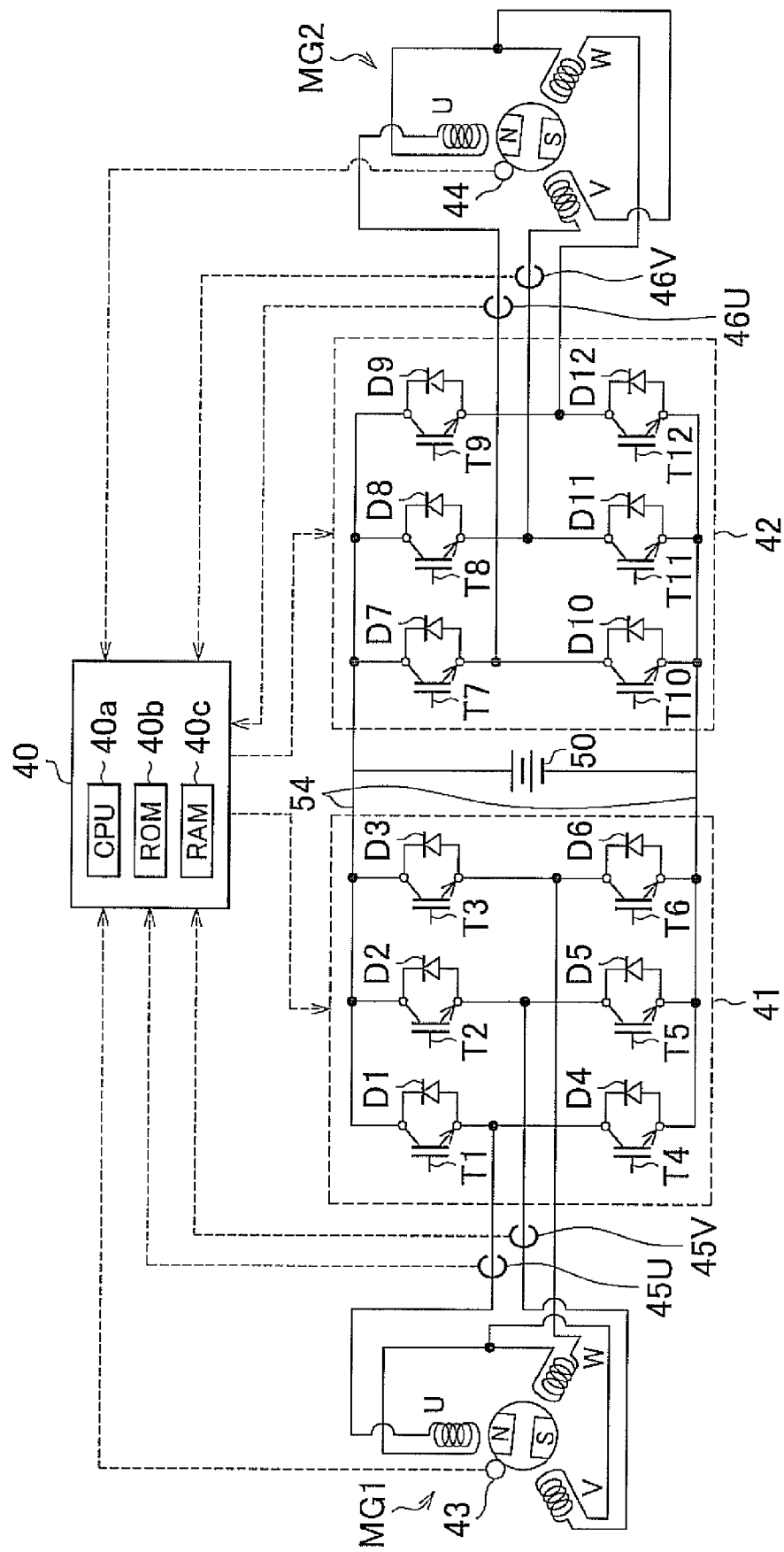
FIG. 2 is a view schematically showing the construction of an electric drive system having motors MG1, MG2 and a battery as shown in FIG. 1, as main components.

FIG. 2 schematically illustrates the construction of an electric drive system having the motors MG1, MG2 and a battery 50 as main components. As shown in FIG. 1 and FIG. 2, the motors MG1, MG2 are in the form of conventional synchronous motor-generators each capable of operating as a generator and also as an electric motor, and are arranged to supply and receive electric power to and from the battery 50 via inverters 41, 42, respectively. Each of the motors MG1, MG2 has a rotor 45a, 46a in which permanent magnets are embedded, and a stator 45b, 46b around which a three-phase coil is wound. Each of the inverters 41, 42 consists of six transistors T1-T6, T7-T12, and six diodes D1-D6, D7-D12 connected in reverse parallel with the transistors T1-T6, T7-T12, respectively. The six transistors T1-T6, T7-T12 of each inverter 41, 42 comprises three pairs of transistors each consisting of a source-side transistor and a sink-side transistor disposed between a positive bus connected to a positive electrode of the battery 50 and a negative bus connected to a negative electrode of the battery 50. Each phase of the three-phase coil (U phase, V phase, W phase) of the motor MG1, MG2 is connected to a connection point of the corresponding pair of transistors. With this arrangement, the ON-time ratio between each pair of the transistors T1-T6, T7-T12 is controlled so that a rotating magnetic field can be formed on the stator 45b, 46b on which the three-phase coil is wound, so as to rotate or drive the motor MG1, MG2. A power line 54 that connects the inverters 41, 42 with the battery 50 consists of the positive bus and negative bus shared by the inverters 41, 42, and electric power generated by one of the motors MG1, MG2 may be consumed by the other motor. Accordingly, the battery 50 may be charged with electric power generated by the motor MG1 or MG2, and may discharge or supply electric power to the motor MG1 or MG2. If the amount of electric power supplied to or received from the motor MG1 is balanced with that received from or supplied to the motor MG2, the battery 50 will not be put on charge or discharge. The motors MG1, MG2 are controlled by an electronic control unit for motors (which will be called "motor ECU") 40.

The motor ECU 40 is configured as a microprocessor having CPU 40a as a main component, and includes ROM 40b that stores control programs, RAM 40c that temporarily stores data, and input/output ports and communication port (not shown), in addition to the CPU 40a. The motor ECU 40 receives signals necessary to control the motors MG1, MG2. For example, the motor ECU 40 receives rotational positions θm1, θm2 of the rotors 45a, 46a of the motors MG1, MG2 from rotational position sensors 43, 44 for detecting the rotational positions of the rotors 45a, 46a of the motors MG1, MG2, and phase currents Iu1, Iv1, Iu2, Iv2 from current sensors 45U, 45V, 46U, 46V for detecting phase currents passing through the U phases and V phases of the three-phase coils of the motors MG1, MG2. The motor ECU 40 sends switching control signals to the transistors T1-T6, T7-T12 of the inverters 41, 42. The motor ECU 40 communicates with the hybrid-system electronic control unit 70, and controls the motors MG1, MG2 according to a control signal from the hybrid-system electronic control unit 70 while transmitting data concerning operating conditions of the motors MG1, MG2 to the hybrid-system electronic control unit 70. The motor ECU 40 calculates the rotational speeds Nm1, Nm2 of the rotors 45a, 46a of the motors MG1, MG2, based on the rotational positions θm1, θm2 of the rotors 45a, 46a received from the rotational position sensors 43, 44.

The transmission 60 has brakes and clutches (not shown), and is arranged to connect the ring gear shaft 32a as a power shaft with the driveshaft 36 and disconnect these shafts 32a, 36 from each other. When the ring gear shaft 32a is connected to the driveshaft 36, the transmission 60 transmits power to the driveshaft 36 while changing the rotational speed of the ring gear shaft 32a at a selected one of four speed ratios.

The parking lock mechanism 90 consists of a parking gear 92 mounted on the driveshaft 36, and a parking lock pole 94 adapted to engage with the parking gear 92 so as to hold the parking gear 92 in a locked state in which the gear 92 is inhibited from rotating. When the hybrid-system electronic control unit 70 receives a signal indicative of an operation of a shift lever from another position to a parking position (P position) or a signal indicative of an operation of a shift lever signal from the P position to another position, the electronic control unit 70 controls an actuator (not shown) for actuating the parking lock pole 94, so as to engage the parking lock pole 94 with the parking gear 92 to achieve a parking lock, or disengage the parking lock pole 94 from the parking gear 92 to release the lock. With the driveshaft 36 mechanically connected to the driving wheels 39a, 39b, the parking lock mechanism 90 indirectly lock the driving wheels 39a, 39b when the shift lever is placed in the P position.

The battery 50 is managed or controlled by an electronic control unit for the battery (which will be called "battery ECU") 52. The battery ECU 52 receives signals necessary to control the battery 50. For example, the battery ECU 52 receives a battery voltage from a voltage sensor (not shown) installed between terminals of the battery 50, charge/discharge current from a current sensor (not shown) mounted in the power line 54 connected to the output terminal of the battery 50, battery temperature Tb from a temperature sensor 51 mounted on the battery 50, and so forth. The battery ECU 52 transmits data concerning the status of the battery 50 to the hybrid-system electronic control unit 70 via communications, as needed. The battery ECU 52 calculates the state of charge (SOC) of the battery 50, for use in control of the battery 50, based on a total value of charge/discharge current detected by the current sensor, and calculates input and output limits Win, Wout as the maximum allowable electric power with which the battery 50 may be charged or which may be discharged from the battery 50.

The hybrid-system electronic control unit 70 is configured as a microprocessor having CPU 72 as a main component, and includes ROM 74 that stores control programs, RAM 76 that temporarily stores data, and input/output ports and communication port (not shown), in addition to the CPU 72. The hybrid-system electronic control unit 70 receives, via the input port, an ignition signal from an ignition switch 80, shift position SP from a shift position sensor 82 for detecting a position to which a shift lever 81 is operated, accelerator pedal position or depression amount Acc from an accelerator pedal position sensor 84 for detecting the amount of depression of an accelerator pedal 83, brake pedal position BP from a brake pedal position sensor 86 for detecting the amount of depression of a brake pedal 85, vehicle speed V from a vehicle speed sensor 88, and so forth. The hybrid-system electronic control unit 70 transmits, via the output port, a drive signal to an actuator (not shown) for placing each of the clutches and brakes of the transmission 60 in an ON/OFF state, a drive signal to an actuator (not shown) of the parking lock mechanism 90, and so forth. The hybrid-system electronic control unit 70 is connected to the engine ECU 24, motor ECU 40, and the battery ECU 52, via the communication port, as described above, and transmits and receives various control signals and data to and from the engine ECU 24, motor ECU 40 and the battery ECU 52.

In the hybrid vehicle 20 of the first embodiment, the positions of the shift lever 81 detected by the shift position sensor 82 include parking position (P position), neutral position (N position), drive position (D position), and reverse position (R position), for example. When the currently selected shift position SP is the D position or the R position, one or more of the clutches and brakes of the transmission 60 corresponding to a selected one of the first-speed through fourth-speed gear positions and reverse gear position is/are engaged so as to place the transmission 60 in the selected one of the first-speed through fourth-speed gear positions and reverse gear position. When the shift position SP is the N position or the P position, all of the clutches and brakes of the transmission 60 are released so that the ring gear shaft 32a and the drive shaft 36 are disconnected from each other. When the shift position SP is the P position, the driving wheels 39a, 39b are locked by the parking lock mechanism 90.

In the hybrid vehicle 20 of the first embodiment constructed as described above, when the currently selected shift position SP is the D position or the R position, the required torque to be applied to the driveshaft 36 is calculated based on the accelerator pedal position Acc corresponding to the amount by which the accelerator pedal 83 is depressed by the driver, and the vehicle speed V, and the operations of the engine 22, motor MG1 and motor MG2 are controlled so that required power corresponding to the required torque is transmitted to the driveshaft 36. Control Modes of operation of the engine 22, motor MG1 and motor MG2 include, for example, a torque conversion operating mode, a charge/discharge operating mode, and a motor operating mode. In the torque conversion operating mode, the engine 22 is controlled so that power equivalent to the required power is generated from the engine 22, and the motor MG1 and the motor MG2 are controlled so that the entire power generated from the engine 22 is converted into torque by means of the power distribution/integration mechanism 30 and the motor MG1 and motor MG2, and the torque is applied to the ring gear shaft 32a. In the charge/discharge operating mode, the engine 22 is controlled so that power equivalent to the sum of the required power and electric power needed for charge/discharge of the battery 50 is generated from the engine 22, and the motor MG1 and the motor MG2 are controlled so that the entire power or a part of the power generated from the engine 22 is converted into torque by means of the power distribution/integration mechanism 30 and the motor MG1 and motor MG2 while the battery 50 is put on charge/discharge, and the required power is transmitted to the ring gear shaft 32a. In the motor operating mode, the operation of the engine 22 is stopped, and the motor MG2 is controlled so that power equivalent to the required power is generated from the motor MG2 to the ring gear shaft 32a.

Figure 3:
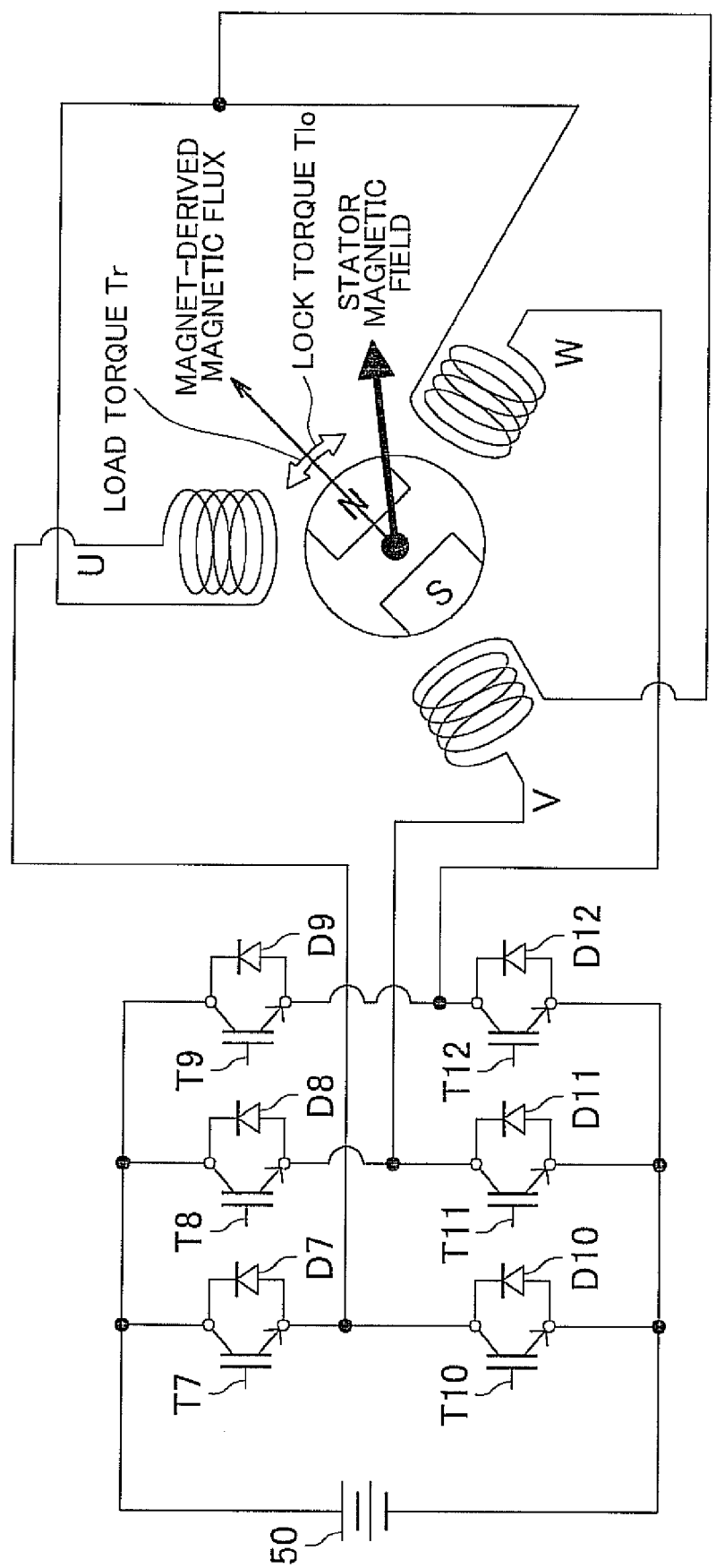
FIG. 3 is an explanatory view useful for explaining control of the motor MG2 shown in FIG. 2.

When the shift position SP is the P position or the N position (i.e., when the ring gear shaft 32a and the driveshaft 36 are disconnected from each other), and the engine 22 is operated under load in response to a request for charge from the battery 50 so that torque is applied from the engine 22 to the ring gear shaft 32a via the power distribution/integration mechanism 30, control for restricting or inhibiting rotation of the rotor 46a (ring gear shaft 32) is executed by fixing the direction of a magnetic field formed on the stator 46b of the motor MG2. In the following description, this control of the motor MG2 will be called "lock control". FIG. 3 is an explanatory view useful for explaining the control of the motor MG2. In the example of FIG. 3, the rotor 46a rotates in a counterclockwise direction when the motor MG2 rotates in a positive direction, and the rotor 46a rotates in a clockwise direction when the motor MG2 rotates in a negative direction. When the motor MG2 is controlled, a composite magnetic field (as indicated by a solid, thick line in FIG. 3) resulting from magnetic fields formed by application of current to the U phase, V phase and W phase, respectively, is formed on the stator 46b of the motor MG2, as shown in FIG. 3. The composite magnetic field thus formed will be called "stator magnetic field". In the lock control, the direction of the stator magnetic field is fixed so as to restrict or inhibit the rotation of the rotor 46a. During the lock control, when the direction of the stator magnetic field coincides with the direction of a magnetic flux formed by the permanent magnets of the rotor 46a of the motor MG2 (which will be called "magnet-derived magnetic flux"), no torque is applied from the motor MG2 to the ring gear shaft 32a as the power shaft. However, when the direction of the stator magnetic field deviates from the direction of the magnet-derived magnetic flux, as shown in FIG. 3, torque (which will be called "lock torque Tlo") is applied from the motor MG2 to the ring gear shaft 32a in such a direction as to match the direction of the stator magnetic field with the direction of the magnet-derived magnetic flux, and the rotor 46a (ring gear shaft 32a) is stopped at a position where torque (which will be called "load torque Tr") applied from the power source (the engine 22 or the motor MG1) to the ring gear shaft 32a is balanced with the lock torque Tlo. It is to be noted that the lock torque Tlo varies in accordance with a deviation or displacement between the direction of the stator magnetic field and the direction of the magnet-derived magnetic flux.

Figure 4:
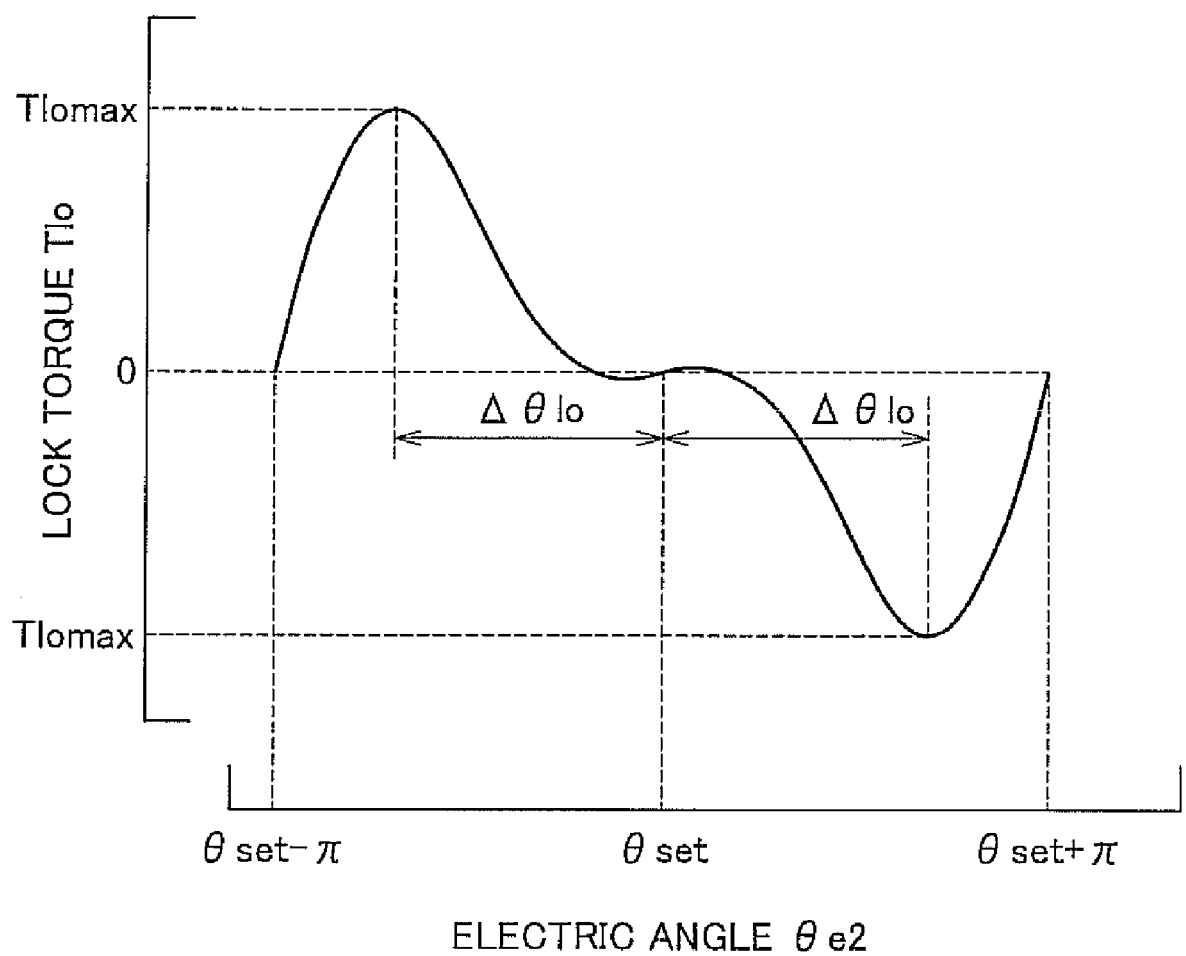
FIG. 4 is an explanatory view showing one example of the relationship between an electric angle corresponding to the direction of a magnet-derived magnetic flux, and lock torque.

FIG. 4 shows one example of the relationship between an electric angle corresponding to the direction of the magnet-derived magnetic flux and the lock torque Tlo. In FIG. 4, "θset" denotes an electric angle for lock control, which is an electric angle corresponding to the direction of the stator magnetic field when lock control is practiced, and "Tlomax" denotes the maximum value of the absolute value of the lock torque Tlo, while "Δθlo" denotes a lock allowable difference as a difference between the electric angle θe2 of the rotor 46a and the electric angle θset for lock control when the lock torque Tlo is equal to the maximum lock torque Tlomax. When the engine 22 is operated under load in response to a charge request from the battery 50 while the ring gear shaft 32a and the driveshaft 36 are disconnected from each other, the engine 22 and the motor MG1 are controlled as follows: the hybrid-system electronic control unit 70 sets target operating conditions (rotational speed, torque) of the engine 22 and a torque command Tm1* of the motor MG1, based on required power Pb* for charging the battery 50, and sends them to the engine ECU 24 and the motor ECU 40. Then, the engine ECU 24 controls the engine 22 so that the engine 22 is operated under the target operating conditions received from the hybrid-system electronic control unit 70, and the motor ECU 40 controls the motor MG1 so that the motor MG1 is driven according to the torque command Tm1* received from the hybrid-system electronic control unit 70.

Figure 5A:
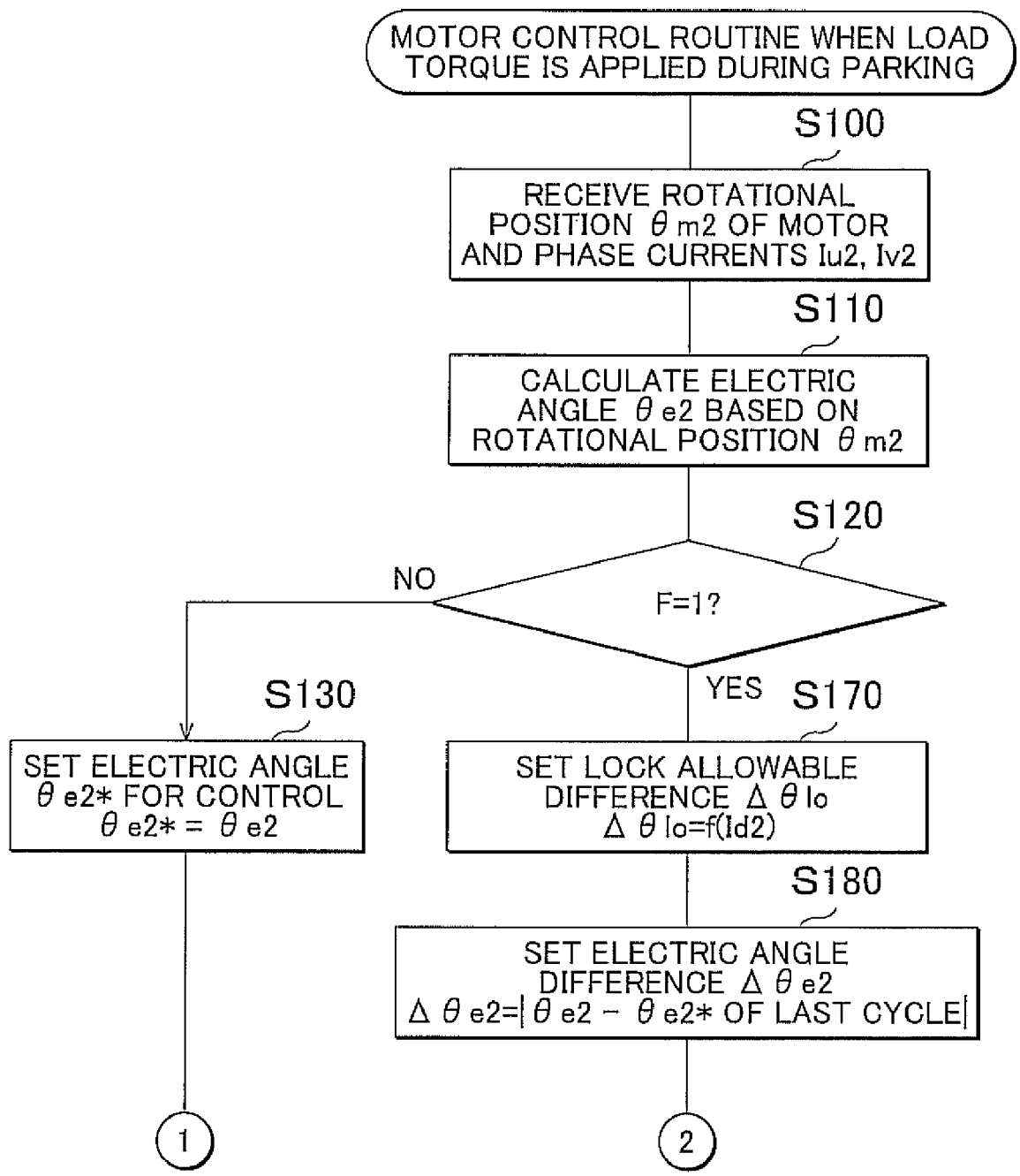

Next, the operation of the hybrid vehicle 20 of the first embodiment constructed as described above, in particular, the control performed on the motor MG2 when torque (load torque Tr) is applied from the power source including the engine 22 and the motor MG1 to the ring gear shaft 32a while the shift lever 81 is placed in the parking (P) position, will be described. FIGS. 5A and 5B are flowcharts illustrating an example of motor control routine executed by the motor ECU 40 when load torque is applied during parking of the vehicle. This routine is repeatedly executed at certain time intervals (of, for example, several msec) when torque is applied from the power source to the ring gear shaft 32a while the currently selected shift position SP is the parking (P) position (i.e., the shift lever 81 is placed in the parking (P) position). When the shift position SP is the parking (P) position, all of the clutches and brakes of the transmission 60 are released, and the ring gear shaft 32a as the power shaft and the driveshaft 36 are disconnected from each other.

Upon execution of the motor control routine when load torque is applied during parking, the CPU 40a of the motor ECU 40 receives necessary data for control, such as phase currents Iu2, Iv2 passing through the U phase and V phase of the three-phase coil from the current sensors 46U, 46V, and the rotational position θm2 of the rotor 46a of the motor MG2 from the rotational position sensor 44 (step S100). The CPU 40a sets an electric angle θe2 by multiplying the rotational position θm2 of the rotor 46a of the motor MG2, by the number of pole pairs "p" (step S110).

Subsequently, the CPU 40a checks a value of an electric angle for control setting flag F, which is set to 0 as the initial value, and is set to 1 when an electric angle θe2* for use in control is set according to a process as described later (step S120). When the value of the electric angle for control setting flag F is 0, the electric angle θe2* for control is set to the electric angle θe2 set in step S110 (step S130), and the electric angle for control setting flag F is set to 1 (step S140). Here, the electric angle θe2* set in step S130 corresponds to the above-mentioned electric angle θset for use in lock control.

Then, the sum total of the phase currents Iu2, Iv2, Iw2 passing through the U phase, V phase and W phase of the three-phase coil of the motor MG2 is set to 0, and the phase currents Iu2, Iv2 are subjected to coordinate conversion (3-phase to 2-phase conversion) to be converted into d-axis and q-axis currents Id2, Iq2 according to Equation (1) below, using the electric angle θe2* for control (step S150). Then, a d-axis current command Id2* at the electric angle θe2* for control is set to a given current I1, and a q-axis current command Iq2* is set to 0 (step S160). In the first embodiment, the given current I1 is set in advance by experiment, or the like, to the smallest possible current value with which rotation of the ring gear shaft 32a can be substantially stopped within a range in which an electric angle difference Δθe2 as will be described later is equal to or smaller than the lock allowable difference Δθlo when the current shift position SP is the P position (i.e., the ring gear shaft 32a and the driveshaft 36 are disconnected from each other) and certain load torque Tr is applied to the ring gear shaft 32a. The smallest possible current value is used as the given current I1 for the following reason. When the lock control is carried out, the motor MG2 is controlled with the electric angle θe2* for control held constant; therefore, large current is likely to flow through a particular phase of the three-phase coil of the motor MG2 and a particular switching device(s) of the inverter 42, and heat is likely to be generated in the motor MG2 and the inverter 42. In the first embodiment, therefore, the smallest possible current value is used as the given current I1 so as to suppress or prevent generation of heat in the motor MG2 and the inverter 42.

$$\begin{bmatrix} Id2 \\ Iq2 \end{bmatrix} = \sqrt{2} \begin{bmatrix} \sin(\theta e2^* + \frac{\pi}{3}) & \sin(\theta e2^*) \\ \cos(\theta e2^* + \frac{\pi}{3}) & \cos(\theta e2^*) \end{bmatrix} \begin{bmatrix} Iu2 \\ Iv2 \end{bmatrix} \quad (1)$$

Then, d-axis and q-axis voltage commands Vd2*, Vq2* are calculated according to Equations (2) and (3) below, using the d-axis and q-axis current commands Id2*, Iq2* and d-axis and q-axis currents Id2, Iq2 (step S240). Then, the d-axis and q-axis voltage commands Vd2*, Vq2* are subjected to coordinate conversion (2-phase to 3-phase conversion), using the electric angle θe2* for control, to be converted into command signals Vu2*, Vv2*, Vw2* to be applied to the U phase, V phase and W phase of the three-phase coil of the motor MG2 (step S250). Then, the voltage commands Vu2*, Vv2*, Vw2* obtained by coordinate conversion are converted into PWM signals for switching the transistors T7-T12 of the inverter 42, and the PWM signals are transmitted to the transistors T7-T12 of the inverter 42 so as to control the motor MG2 (step S260). Then, the current cycle of the motor control routine of FIGS. 5A and 5B ends. In Eq. (2) and Eq. (3) as indicated below, "Kp1" and "Kp2" are factors of proportionality, and "Ki1" and "Ki2" are factors of integration. In this manner, the lock control as described above is carried out.

$$Vd2^* = Kp1(Id2^* - Id2) + Ki1 \sum (Id2^* - Id2) \quad (2)$$

$$Vq2^* = Kp2(Iq2^* - Iq2) + Ki2 \sum (Iq2^* - Iq2) \quad (3)$$

$$\begin{bmatrix} Vu2^* \\ Vv2^* \end{bmatrix} = \sqrt{2} \begin{bmatrix} \cos(\theta e2^*) & -\sin(\theta e2^*) \\ \cos(\theta e2^* - \frac{2\pi}{3}) & -\sin(\theta e2^* - \frac{2\pi}{3}) \end{bmatrix} \begin{bmatrix} Vd2^* \\ Vq2^* \end{bmatrix} \quad (4)$$

$$Vw2^* = -Vu2^* - Vv2^* \quad (5)$$

Figure 6:
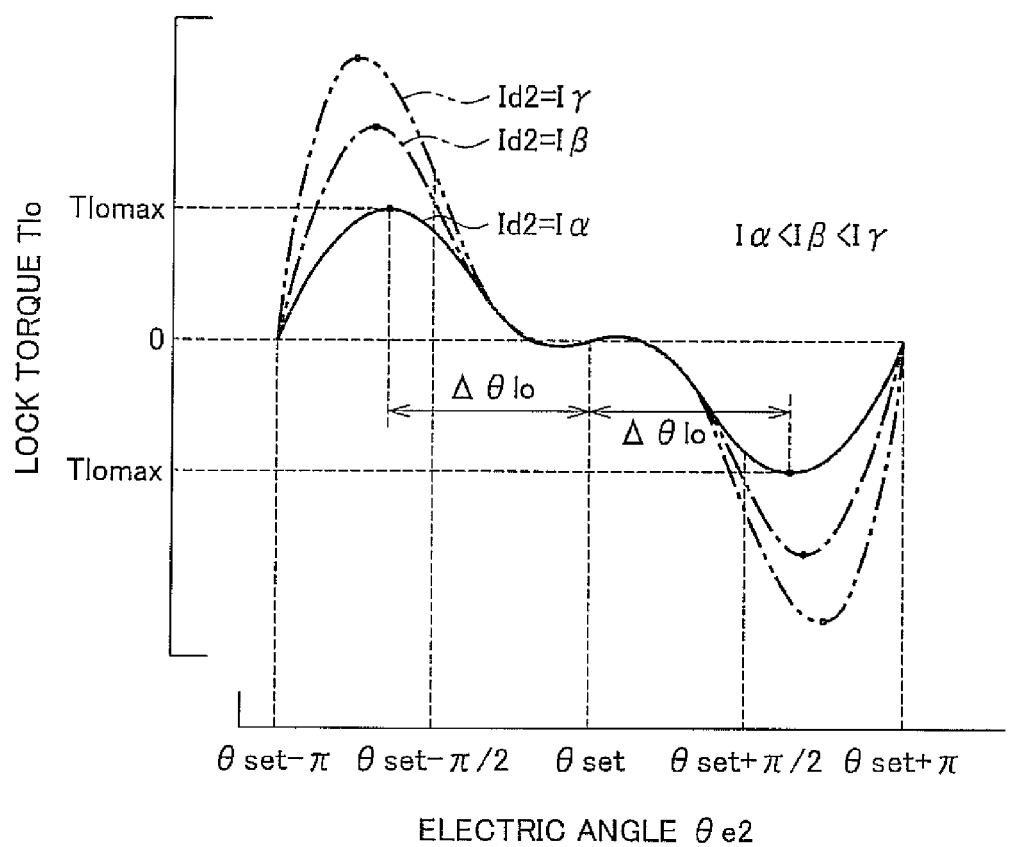
FIG. 6 is an explanatory view showing one example of the relationship among d-axis current, electric angle, electric angle for lock control, and lock torque.
Figure 7:
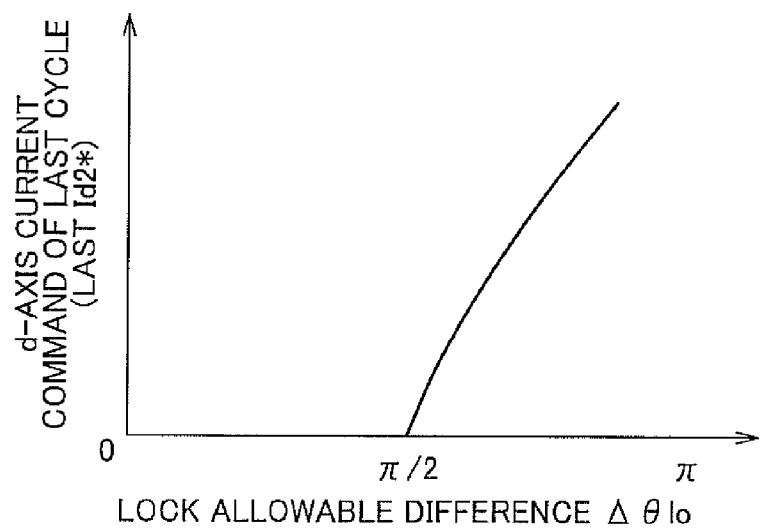
FIG. 7 is an explanatory view showing one example of map for use in setting of a lock allowable difference, in the power output apparatus of the first embodiment.

When the value of the electric angle for control setting flag F is 1 in step S120, a lock allowable difference Δθlo is set based on the d-axis current Id2 (step S170). In the first embodiment, the d-axis current command (Id2* of the last cycle) set when this routine was executed last time is used as the d-axis current Id2 in the current cycle. FIG. 6 shows one example of the relationships among the d-axis current Id2, electric angle θe2, electric angle θset for lock control, and the lock torque Tlo. In FIG. 6, "θset" denotes the electric angle for lock control, and "Tlomax" denotes the maximum value of the absolute value of the lock torque Tlo, while "Δθlo" denotes the lock allowable difference. In the first embodiment in which the permanent magnets are embedded in the rotor 46a of the motor MG2, reluctance torque is produced in addition to torque produced by the permanent magnets. Therefore, the lock allowable difference Δθlo is set to be larger as the d-axis current Id2 increases (as the maximum lock torque Tlomax increases) within a range in which a difference between the electric angle θset for lock control and the electric signal θe2 of the rotor 46a is equal to or larger than π/2 and smaller than π, as shown in FIG. 6. In the first embodiment, therefore, the relationship between the d-axis current Id2 and the lock allowable difference Δθlo is determined in advance by experiment, or the like, and is stored in the ROM 40b as a map for use in setting of the lock allowable difference. When a d-axis current Id2 is given, a corresponding lock allowable difference Δθlo is derived from the stored map, and set. FIG. 7 shows an example of map for use in setting of the lock allowable difference. Where a motor MG2 having permanent magnets attached to a surface of the rotor 46a is used, no reluctance torque is produced, and therefore, the lock allowable difference Δθlo is equal to π/2 irrespective of the d-axis current Id2.

Subsequently, an electric angle difference Δθe2 as a difference between the electric angle θe2 and the electric angle for control (θe2* of the last cycle) set when this routine was executed last time is set (step S180), and the electric angle difference Δθe2 set in step S180 is compared with the lock allowable difference Δθlo (step S190). When the absolute value of the load torque Tr is equal to or smaller than the maximum lock torque Tlomax, rotation of the rotor 46a (ring gear shaft 32) is substantially stopped at a position where the load torque Tr is balanced with the lock torque Tlo, within a range in which the electric angle difference Δθe2 is equal to or smaller than the lock allowable difference Δθlo. However, when the load torque Tr becomes larger than the maximum lock torque Tlomax due to operating conditions (rotational speed, torque) of the engine 22 or driving conditions (rotational speed, torque) of the motor MG1, variations thereof, or the like, rotation of the rotor 46a (ring gear shaft 32a) cannot be substantially stopped by the lock torque Tlo, within the range in which the electric angle difference Δθe2 is equal to or smaller than the lock allowable difference Δθlo. As a result, the rotor 46a rotates. To compare the electric angle difference Δθe2 with the lock allowable difference Δθlo in step S190 is a process for determining whether rotation of the rotor 46a (ring gear shaft 32a) is sufficiently restricted or inhibited (i.e., rotation of the rotor 46a is substantially stopped) by the lock torque Tlo.

When the electric angle difference Δθe2 is equal to or smaller than the lock allowable difference Δθlo, it is determined that the rotation of the rotor 46 is sufficiently restricted or inhibited by the lock torque Tlo, and the electric angle (θe2* of the last cycle) set when the routine of FIGS. 5A and 5B was executed last time is set as the electric angle θe2* for control (step S200). Namely, the electric signal θe2* for control is maintained or held constant. Thus, if the electric angle difference Δθe2 is kept equal to or smaller than the lock allowable difference Δθlo from start of the lock control to the current time, the electric angle θe2* for control set in step S130 is maintained.

Once the electric angle θe2* for control is set in the above manner, the phase currents Iu2, Iv2 are subjected to coordinate conversion (3-phase to 2-phase conversion) according to Equation (1) in the same manner as in step 150 as described above, using the thus set electric angle θe2* for control, to be converted into d-axis and q-axis currents Id2, Iq2 (step S220). Then, a d-axis current command Id2* is set based on the electric angle difference Δθe2 while a q-axis current command Iq2* is set to 0 (step S230), and step S240 and subsequent steps are then executed. In the first embodiment, the relationship between the electric angle difference Δθe2 and the d-axis current command Id2* is determined in advance by experiment, or the like, and is stored in the ROM 40b as a map for use in setting of the d-axis current command. If an electric angle difference Δθe2 is given, a corresponding d-axis current command Id*2 is derived from the map.

Figure 8:
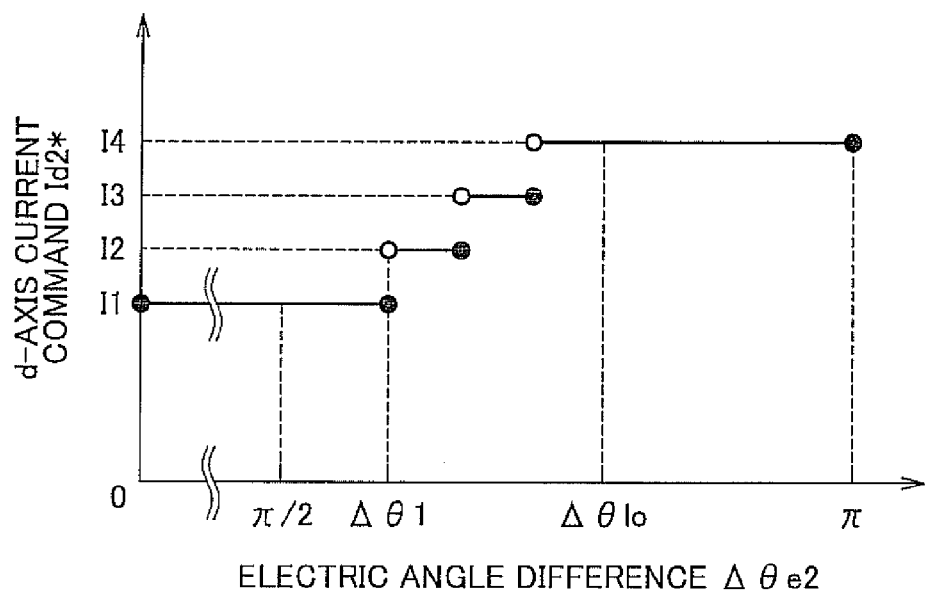
FIG. 8 is an explanatory view showing one example of map for use in setting of a d-axis current command, in the power output apparatus of the first embodiment.

FIG. 8 shows an example of map for use in setting of the d-axis current command. As shown in FIG. 8, the d-axis current command Id2* is set to the above-mentioned given current I1 where the electric angle difference Δθe2 is equal to or smaller than Δθ1. Where the electric angle difference Δθe2 is larger than Δθ1, the d-axis current command Id2* is set to one of given currents I2, I3, I4 that increase in this order as the electric angle difference Δθe2 increases. To determine the value Δθ1, a value close to the minimum value of a range in which the electric angle difference Δθe2 exceeds the lock allowable difference Δθlo and the ring gear shaft 32a may rotate when the motor MG is controlled with the d-axis current Id2* set to the given current I1 may be determined by experiment, or the like, and used. For example, a value expressed as (Δθlo−π/12) or a value expressed as (Δθlo−π/6), or the like, may be used. The d-axis current command Id2* is set in the above manner for the following reason. When the electric angle difference Δθe2 is relative large within the range equal to or smaller than the lock allowable difference Δθlo, there is a possibility that the electric angle difference Δθe2 exceeds the lock allowable difference Δθlo, resulting in rotation of the ring gear shaft 32a. In this embodiment, in order to reduce the possibility of rotation of the ring gear shaft 32a, the d-axis current command Id2* is set to be larger as the electric angle difference Δθe2 increases, in a range where the electric angle difference Δθe2 is larger than Δθ1. When the electric angle difference Δθe2 is equal to or smaller than the lock allowable difference Δθlo, the motor MG2 is controlled with the electric angle θe2* for control thus maintained or held constant, so that the lock control is continued.

When the electric angle difference Δθe2 is larger than the lock allowable difference Δθlo in step S190, it is determined that rotation of the rotor 46a is not sufficiently restricted or inhibited by the lock torque Tlo (i.e., the rotor 46a rotates). In this case, if the electric angle θe2 of the rotor 46a is larger than the electric angle for control (last θe2*) obtained in the last cycle (i.e., when the rotor 46a rotates in the positive direction), the electric angle θe*2 for control is obtained by subtracting the lock allowance difference Δθlo from the electric angle θe2 of the rotor 46a, as indicated by Equation (6) below. If the electric angle θe2 of the rotor 46a is smaller than the electric angle for control (last θe2*) obtained in the last cycle (i.e., when the rotor 46a rotates in the negative direction), the electric angle θe*2 for control is obtained by adding the lock allowable difference Δθlo to the electric angle θe2 of the rotor 46a, as indicated by Equation (7) below (step S210). Then, the phase currents Iu2, Iv2 are subjected to coordinate conversion (3-phase to 2-phase conversion), to be converted into d-axis and q-axis currents Id2, Iq2 (step S220), and the d-axis current command Id2* is set based on the electric angle difference Δθe2 while the q-axis current command Iq2* is set to 0 (step S230). Then, step S240 and subsequent steps are executed.

In the first embodiment, the d-axis current command Id2* set in step S230 in the above case is set to the same given current I4 as that used when the electric angle difference Δθe2 is equal to the lock allowable difference Δθlo, using the map for use in setting of the d-axis current command as shown in FIG. 8. When the electric angle difference Δθe2 is larger than the lock allowable difference Δθlo, the motor MG2 is controlled using the electric angle θe2* for control determined according to the direction of rotation of the rotor 46a, electric angle θe2 and the lock allowable difference Δθlo, so that the direction of the stator magnetic field rotates in accordance with rotation of the direction of the magnet-derived magnetic flux, and the maximum lock torque Tlomax is applied from the motor MG2 to the ring gear shaft 32a in a direction opposite to that of the load torque Tr, thereby to reduce the amount of increase in the rotational speed Nm2 of the rotor 46a (the rotational speed Nr of the ring gear shaft 32a). In the following description, the control for reducing the amount of increase in the rotational speed Nm2 of the rotor 46a in this manner will be called "rotation retardation control". The rotation retardation control is different from the above-described lock control in the following points: the lock control is to control the motor MG2 while holding the electric angle θe2* for control constant, so that the direction of the stator electric field is fixed, and lock torque Tlo that is equal to or smaller in magnitude than the maximum lock torque Tlomax is applied from the motor MG2 to the ring gear shaft 32a, thereby to restrict or inhibit rotation of the rotor 46a. On the other hand, the rotation retardation control is to control the motor MG2 while varying the electric angle θe2* for control in accordance with rotation of the rotor 46a, so that a displacement between the direction of the magnet-derived magnetic flux and the direction of the stator magnetic field is made substantially constant, and the maximum lock torque Tlomax is applied from the motor MG2 to the ring gear shaft 32a, thereby to retard rotation of the rotor 46a.

When the next and subsequent cycles of the routine of FIGS. 5A and 5B are executed, the electric angle difference Δθe2 is larger than the lock allowable difference Δθlo in step S190 as long as the rotor 46a (ring gear shaft 32a) rotates in a certain direction, and therefore, step S210 and subsequent steps are executed. In this case, the rotation retardation control is continued. With this control, the rotational speed Nm2 of the rotor 46a can be quickly reduced when the absolute value of the load torque Tr is reduced. If the absolute value of the load torque Tr becomes smaller than the maximum lock torque Tlomax, and the rotational speed Nm2 of the rotor 46a is reduced down to 0, the electric angle difference Δθe2 becomes equal to or lower than the lock allowable difference Δθlo in step S190, and step S200 and subsequent steps are executed. Namely, the motor ECU 40 switches from the rotation retardation control to the lock control when rotation of the rotor 46a is substantially stopped. By executing the rotation retardation control until the rotation of the rotor 46a is stopped, the rotation of the rotor 46a can be smoothly stopped when the absolute value of the load torque Tr becomes smaller than the maximum lock torque Tlomax.

$$\theta e2^* = \theta e2 - \Delta\theta lo (\theta e2 > \theta e2^* \text{ of the last cycle}) \tag{6}$$

$$\theta e2^* = \theta e2 + \Delta\theta lo (\theta e2 < \theta e2^* \text{ of the last cycle}) \tag{7}$$

Figure 9:
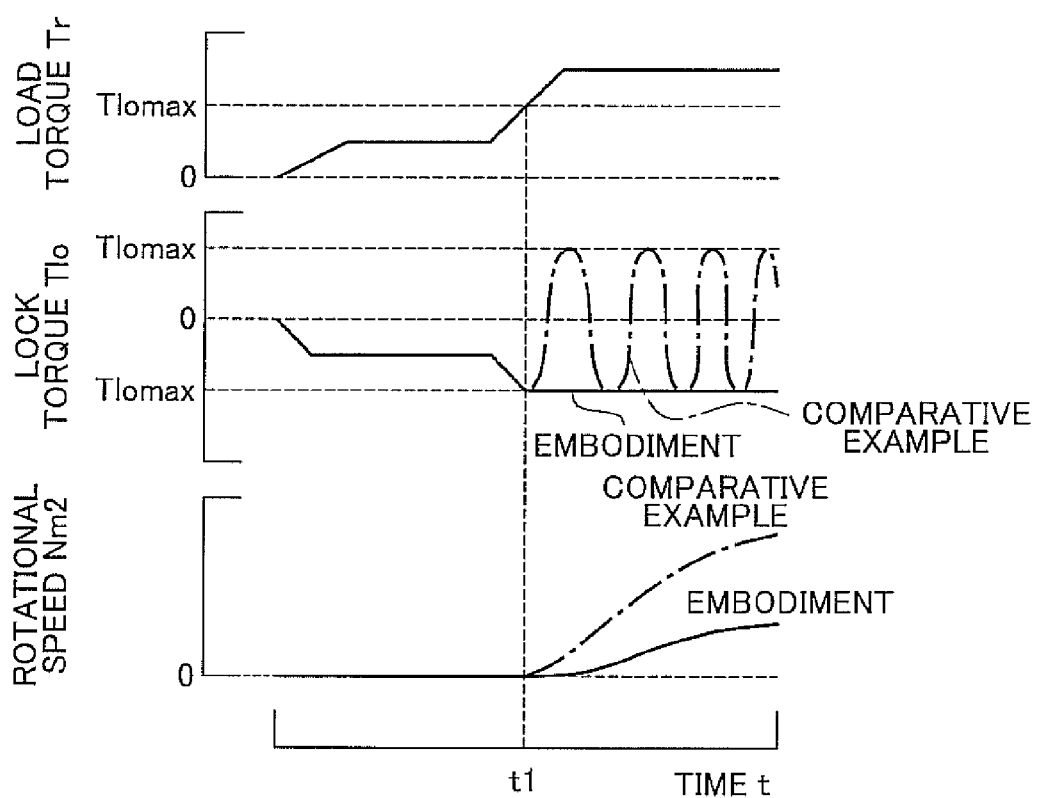
FIG. 9 is an explanatory view showing one example of variations in load torque, lock torque and the rotational speed of a rotor when torque is applied from a power source to a ring gear shaft, with respect to time.

FIG. 9 is an explanatory view showing one example of variations in the load torque Tr, lock torque Tlo and the rotational speed Nm2 of the rotor 46a with time when torque is applied from the power source to the ring gear shaft 32a. In FIG. 9, solid lines indicate variations in the above-indicated quantities Tr, Tlo and Nm2 in the first embodiment in which the rotation retardation control is executed when the absolute value of the load torque Tr becomes larger than the maximum lock torque Tlomax, and the electric angle difference Δθe2 becomes larger than the lock allowable difference Δθlo. In FIG. 9, alternate long and short dashed lines indicate variations in the same quantities in a comparative example in which the lock control is continued even after the electric angle difference Δθe2 becomes larger than the lock allowable difference Δθlo. If the lock control is continued after t1 at which the electric angle difference Δθe2 becomes larger than the lock allowable difference Δθlo, the lock torque Tlo fluctuates as indicated by the dashed lines in FIG. 9; therefore, the rotation of the ring gear shaft 32a cannot be retarded, and the rotational speed Nm2 of the rotor 46a (the rotational speed Nr of the ring gear shaft 32a) is likely to increase. In the first embodiment, on the other hand, the rotation retardation control is executed after time t1, so that the maximum lock torque Tlomax is applied from the motor MG2 to the ring gear shaft 32a in the direction opposite to that of the load torque Tr, and the amount or rate of increase in the rotational speed of the rotor 46a can be reduced, as indicated by the solid lines in FIG. 9.

In the hybrid vehicle 20 of the first embodiment as described above, the motor MG2 is controlled under the lock control, using a constant electric angle $\theta e2^*$ for control, so that rotation of the rotor 46a is restricted or inhibited within a range in which the electric angle difference $\Delta\theta e2^*$ is equal to or smaller than the lock allowable difference $\Delta\theta lo$. When the electric angle difference $\Delta\theta e2^*$ becomes larger than the lock allowable difference $\Delta\theta lo$ during execution of the lock control, the motor MG2 is controlled, using the electric angle $\theta e2^*$ for control set according to the direction of rotation of the rotor 46a, electric angle difference $\Delta\theta e2$ and the lock allowable difference $\Delta\theta lo$. As a result, the direction of the stator magnetic field rotates in accordance with rotation of the rotor 46a (rotation of the direction of the magnet-derived magnetic flux), and the maximum lock torque Tlomax is applied from the motor MG2 to the ring gear shaft 32a in the direction opposite to that of the load torque Tr, so that the amount or rate of increase in the rotational speed Nm2 of the rotor 46a can be reduced.

In the hybrid vehicle 20 of the first embodiment, the motor MG2 is controlled with the d-axis current command Id2* set to a larger value as the electric angle difference $\Delta\theta e2$ increases; therefore, the possibility that the electric angle difference $\Delta\theta e2$ becomes larger than the lock allowable difference $\Delta\theta lo$ is reduced.

Figure 10:
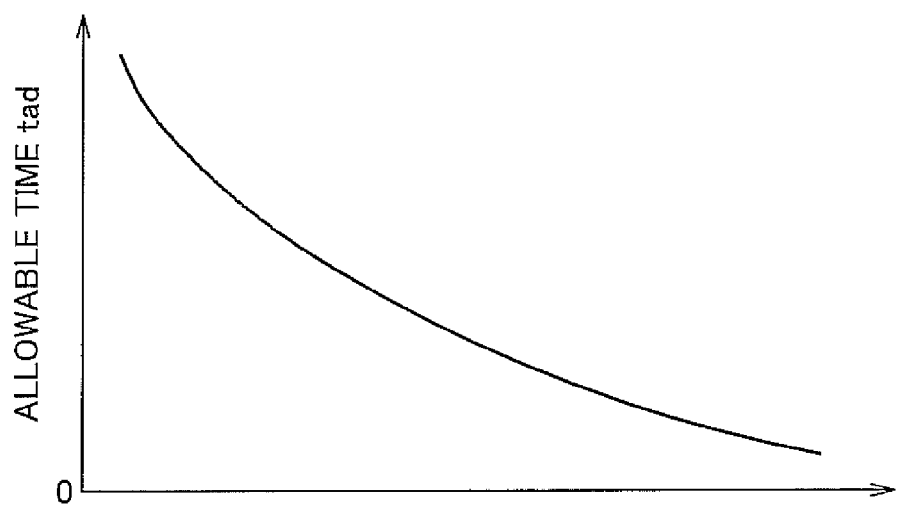
FIG. 10 is an explanatory view showing one example of the relationship between the d-axis current and an allowable time, in the power output apparatus of the first embodiment.

In the hybrid vehicle 20 of the first embodiment, the d-axis current command Id2* is set to one of the given currents I1, I2, I3, I4 that increase in this order as the electric angle difference $\Delta\theta e2$ increases, as illustrated in the map of FIG. 8 for use in setting of the d-axis current command. However, in a range where the electric angle difference $\Delta\theta e2$ is larger than $\Delta\theta 1$, the d-axis current command Id2* may be set in a different manner: the relationship between the d-axis current Id2 and allowable time tad as a length of time for which the d-axis current Id2 is allowed to continuously pass through the motor MG2 is determined in advance by experiment, or the like, and the d-axis current command Id2* is set to a current value corresponding to the electric angle difference $\Delta\theta e2$ when energization time tcon as a length of time for which the current corresponding to the electric angel difference $\Delta\theta e2$ continuously passes through the motor MG2 is equal to or shorter than the allowable time tad, whereas the d-axis current command Id2* is set to the given current I1 when the energization time tcon exceeds the allowable time tad. FIG. 10 shows one example of the relationship between the d-axis current Id2 and the allowable time tad. The allowable time tad is set to be shorter as the d-axis current Id2 increases, as shown in FIG. 10, for the reason as follows. Since the electric angle $\theta e2^*$ for control is held constant when the motor MG2 is controlled under the lock control, current that passes through a particular phase of the three-phase coil of the motor MG2 or a particular switching device(s) of the inverter 42 is likely to increase and generate heat, and the quantity of heat thus generated increases as the current (d-axis current Id2) passing through the motor MG2 increases. Accordingly, in this modified example, the allowable time tad is set to be shorter as the d-axis current Id2 increases, so as to curb or prevent generation of heat in the motor MG2 and the inverter 42. Thus, when the energization time tcon is equal to or shorter than the allowable time tad, the motor MG is controlled with the d-axis current command Id2* set to a current value corresponding to the electric angle difference $\Delta\theta e2$. When the energization time tcon exceeds the allowable time tad, the motor MG2 is controlled with the d-axis current command Id2* set to the given current I1, so that heat generation in the motor MG2 and the inverter 42 is curbed or suppressed during the lock control. In this case, since the d-axis current command Id2* is set to the given current I1 when the energization time tcon exceeds the allowable time tad, the maximum lock torque Tlomax is reduced as compared with the time when the energization time tcon is equal to or shorter than the allowable time tad; therefore, the electric angle difference $\Delta\theta e2$ is more likely to be larger than the lock allowable difference $\Delta\theta lo$. While the allowable time tad is set based on the d-axis current Id2 in this modified example, a fixed value within a range in which the motor MG2 and the inverter 42 can be thermally protected may be used as the allowable time tad.

In the hybrid vehicle 20 of the first embodiment, where the electric angle difference $\Delta\theta e2$ is larger than $\Delta\theta 1$, the d-axis current command Id2* is set to one of three given currents I2, I3, I4 that increase stepwise in this order as the electric angle difference $\Delta\theta e2$ increases, as illustrated in the map of FIG. 8 used for setting the d-axis current command. However, the d-axis current command Id2* may be set to one of two, or four or more current values that increase stepwise as the electric angle difference $\Delta\theta e2$ increases. Also, the d-axis current value Id2* may be set to increase linearly or along a curve as the electric angle difference $\Delta\theta e2$ increases, or the d-axis current value Id2 may be set to the given current I1, irrespective of the electric angle difference $\Delta\theta e2$.

In the hybrid vehicle 20 of the first embodiment, the d-axis current command Id2* is set to one of the given currents I1, I2, I3, I4 that increase in this order as the electric angle difference $\Delta\theta e2$ increases, as illustrated in the map of FIG. 8 used for setting the d-axis current command. However, the d-axis current command Id2* may be set to increase as the absolute value of the load torque Tr increases. In this case, estimated load torque Trest that is estimated to be applied to the ring gear shaft 32a may be set based on the operating conditions of the engine 22 and the driving conditions of the motor MG1, for example, and the d-axis current command Id2* may be set to a current value Itr with which the rotating ring gear shaft 32a can be substantially stopped at a position where the electric angle difference $\Delta\theta e2$ is equal to or smaller than the lock allowable difference $\Delta\theta lo$ (for example, at a position where the electric angle difference $\Delta\theta e2$ is around the value $\Delta\theta 1$) when the estimated load torque Trest thus set is applied to the ring gear shaft 32a, or may be set to a current value (ITr+$\Delta$Itr) obtained by adding a certain margin $\Delta$Itr to the current value Itr. In this manner, current commensurate with the magnitude of the load torque Tr can be passed through the motor MG2, and the stator magnetic field whose strength corresponds to this current is formed. Thus, current that is larger than necessary is prevented from being applied to the motor MG2. When the d-axis current command Id2* is set to the current value (Itr+$\Delta$Itr), the margin $\Delta$Itr may be set to a larger value as the electric angle difference $\Delta\theta e2$ increases.

Figure 11:
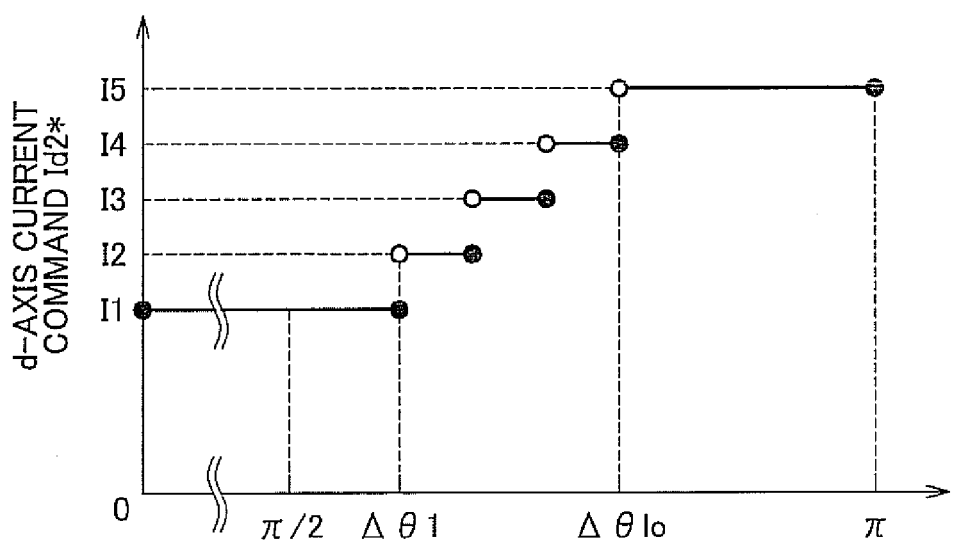
FIG. 11 is an explanatory view showing one example of map for use in setting of the d-axis current command in a modified example of the first embodiment.

In the hybrid vehicle 20 of the first embodiment, where the electric angle difference $\Delta\theta e2$ is larger than a difference somewhat smaller than the lock allowable difference $\Delta\theta lo$, the d-axis current command Id2* is set to the given current I4 irrespective of whether the electric angle difference $\Delta\theta e2$ is larger or smaller than the lock allowable difference $\Delta\theta lo$, as illustrated in the map of FIG. 8 used for setting the d-axis current command. However, when the electric angle difference $\Delta\theta e2$ is larger than the lock allowable difference $\Delta\theta lo$, the d-axis current command Id2* may be set to a current that is larger than a current set as the d-axis current command Id2* when the electric angle difference $\Delta\theta e2$ is equal to or smaller than the lock allowable difference $\Delta\theta lo$. FIG. 11 shows an example of map used in this case for setting the d-axis current command. In the example of FIG. 11, when the electric angle difference $\Delta\theta e2$ is equal to or smaller than the lock allowable difference $\Delta\theta lo$, the d-axis current command Id2* is set to a selected one of the given currents I1-I4, based on the electric angle difference $\Delta\theta e2$. When the electric angle difference $\Delta\theta e2$ is larger than the lock allowable difference $\Delta\theta lo$, the d-axis current command Id2* is set to a given current I5 that is larger than any of the given currents I1, I2, I3, I4. In this manner, when the electric angle difference $\Delta\theta e2$ is larger than the lock allowable difference $\Delta\theta lo$, the strength of the stator magnetic field can be further increased; therefore, the magnitude of the maximum lock torque Tlomax can be further increased, and the amount or rate of increase in the rotational speed Nm of the rotor 46a (rotational speed Nr of the ring gear shaft 32a) can be further reduced. In this modified example, when the electric angle difference $\Delta\theta e2$ is larger than the lock allowable difference $\Delta\theta lo$, the d-axis current command Id2* is set to the current (I5) that is larger than that set as the d-axis current command Id2* when the electric angle difference $\Delta\theta e2$ is equal to or smaller than the lock allowable difference $\Delta\theta lo$. In place of or in addition to the setting of the d-axis current command Id2* in this manner, the engine 22 and the motor MG1 may be controlled so that the magnitude of the load torque Tr is smaller when the electric angle difference $\Delta\theta e2$ is larger than the lock allowable difference $\Delta\theta lo$, than that of the case where the electric angle difference $\Delta\theta e2$ is equal to or smaller than the lock allowable difference $\Delta\theta lo$. In this case, when the electric angle difference $\Delta\theta e2$ is larger than the lock allowable difference $\Delta\theta lo$, the motor ECU 40 may send a load-torque reduction command to the hybrid-system electronic control unit 70 so as to reduce the load torque Tr. Having received the load-torque reduction command, the hybrid-system electronic control unit 70 may set target operating conditions (rotational speed, torque) of the engine 22 and a torque command Tm1* of the motor MG1 and send them to the engine ECU 24 and the motor ECU 40, so as to reduce the load torque Tr to be smaller than that of the case where no load-torque reduction torque is received, namely, so as to reduce torque generated from the engine 22 and the motor MG1. Then, the engine ECU 24 that has received the target operating conditions controls the engine 22 so that the engine 22 is operated at a target operating point, and the motor ECU 40 controls the motor MG1 so that the motor MG1 is driven with the torque command Tm1*. In this case, too, the amount or rate of increase in the rotational speed Nm2 of the rotor 46a (rotational speed Nr of the ring gear shaft 32a) can be reduced.

Next, a hybrid vehicle 20B according to a second embodiment of the invention will be described. The hybrid vehicle 20B of the second embodiment has the same hard construction as the hybrid vehicle 20 of the first embodiment as described above with reference to FIG. 1. In order to avoid repeated explanation, the hard construction of the hybrid vehicle 20B of the second embodiment will not be described in detail.

Figure 12A:
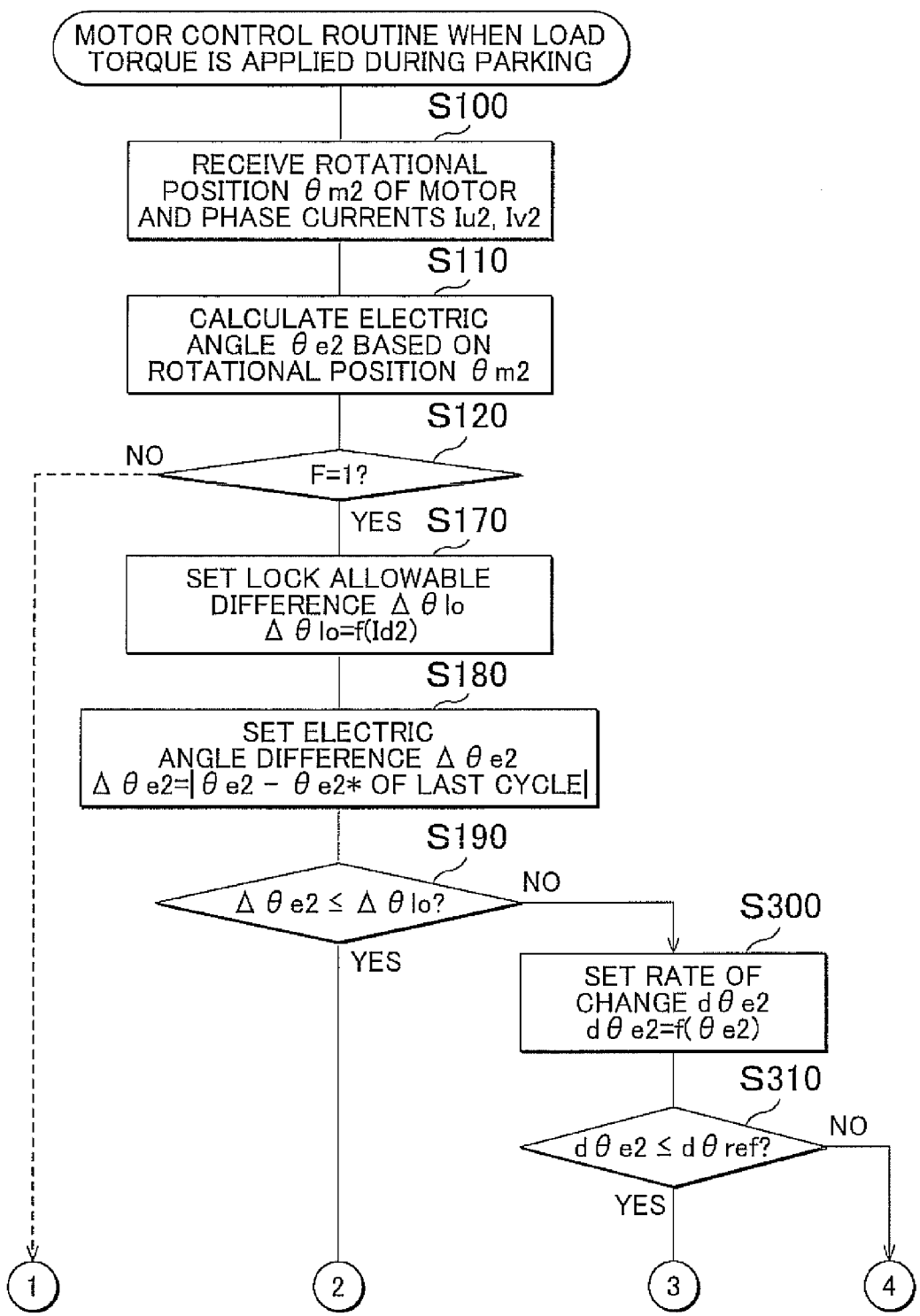
FIGS. 12A and 12B are flowcharts illustrating one example of motor control routine executed by a motor ECU of a power output apparatus according to a second embodiment of the invention when load torque is applied during parking.
Figure 12B:
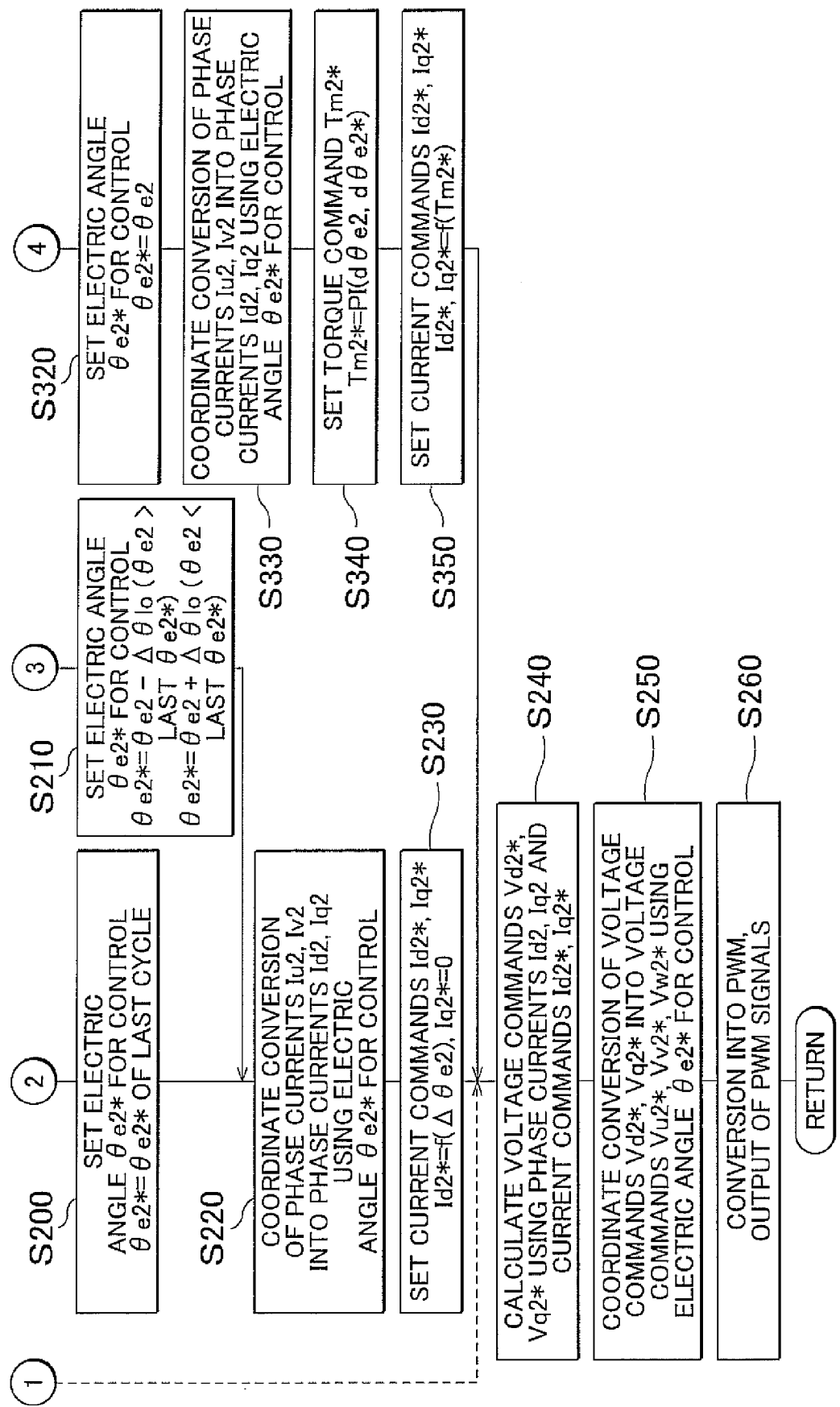

In the hybrid vehicle 20B of the second embodiment, the motor ECU 40 executes a motor control routine of FIGS. 12A and 12B when load torque is applied during parking of the vehicle, in place of the motor control routine of FIGS. 5A and 5B executed when load torque is applied during parking. The motor control routine of FIGS. 12A and 12B are identical with the motor control routine of FIGS. 5A and 5B except that steps S300-S350 are added. Accordingly, some of the same steps are illustrated with the same step numbers, while the remaining steps are not illustrated in FIGS. 12A and 12B.

In the motor control routine of FIGS. 12A and 12B executed when load torque is applied during parking, when the electric angle difference $\Delta\theta e2$ is larger than the lock allowable difference $\Delta\theta lo$ in step S190, a rate of change $d\theta e2$ of the electric angle $\theta e2$ is set (step S300). As the rate of change $d\theta e2$, a value ($\theta e2-\theta e2$ of the last cycle) obtained by subtracting the electric angle ($\theta e2$ of the last cycle) set when this routine was executed last time from the electric angle $\theta e2$ set in step S110 may be used, or a value (($\theta e2-\theta e2$ of the last cycle)/dt) obtained by dividing the above value ($\theta e2-\theta e2$ of the last cycle) by time dt as an interval at which this routine is started may be used, or the average of the above-indicated values ($\theta e2-\theta e2$ of the last cycle) or the above-indicated values (($\theta e2-\theta e2$ of the last cycle)/dt) of the current and some previous cycles may be used. The rate of change $d\theta e2$, which corresponds to or proportionally reflects the angular velocity of the rotor 46a, may be considered as equivalent to the angular velocity or rotational speed Nm2 of the rotor 46a.

Subsequently, the rate of change $d\theta e2$ set in step S300 is compared with a threshold value $d\theta ref$ (step S310). If the rate of change $d\theta e2$ is equal to or smaller than the threshold value $d\theta ref$, step S210 and subsequent steps are executed. The threshold value $d\theta ref$ is a threshold value used for determining whether the rotor 46a (ring gear shaft 32a) is rotating at some rotational speed. When the rate of change $d\theta e2$ is larger than the threshold value $d\theta ref$, it is determined that the rotor 46a is rotating at some rotational speed, and the electric angle $\theta e2$* for control is set to the electric angle $\theta e2$ of the rotor 46a (step S320). Then, similarly to the operation of step S220, the phase currents Iu2, Iv2 are subjected to coordinate conversion (3-phase to 2-phase conversion) according to Equation (1) above, to be converted into d-axis and q-axis currents Id2, Iq2 (step S330), and the torque command Tm2* of the motor MG2 is set according to Equation (8) below for feedback control, so that the rate of change $d\theta e2$ of the electric angle $\theta e2$ (the rotational speed Nm of the rotor 46a corresponding to the rate of change $d\theta e2$) is reduced toward 0 (step S340). Then, the d-axis and q-axis current commands Id2*, Iq2* are set based on the torque command Tm2* set in step S340 (step S350), and step S240 and subsequent steps are executed. In Equation (8), "Kp3" is a gain of the proportional term, and "Ki3" is a gain of the integral term. In the second embodiment, the d-axis and q-axis current commands Id2*, Iq2* are set in step S350 in the following manner: the relationship between the torque command Tm2* and the d-axis and q-axis current commands Id2*, Iq2* (for example, the relationship according to which the motor M2 can be driven with the torque command Tm2* by making the square root of the sum of the square of the current command Id2* and the square of the current command Iq2* (which will be called "current command value Im2* for torque output") relatively small) is stored in advance as a map in the ROM 40b, and, when a torque command Tm2* is given, the corresponding current commands Id2*, Iq2* are derived from the map and set.

Figure 13:
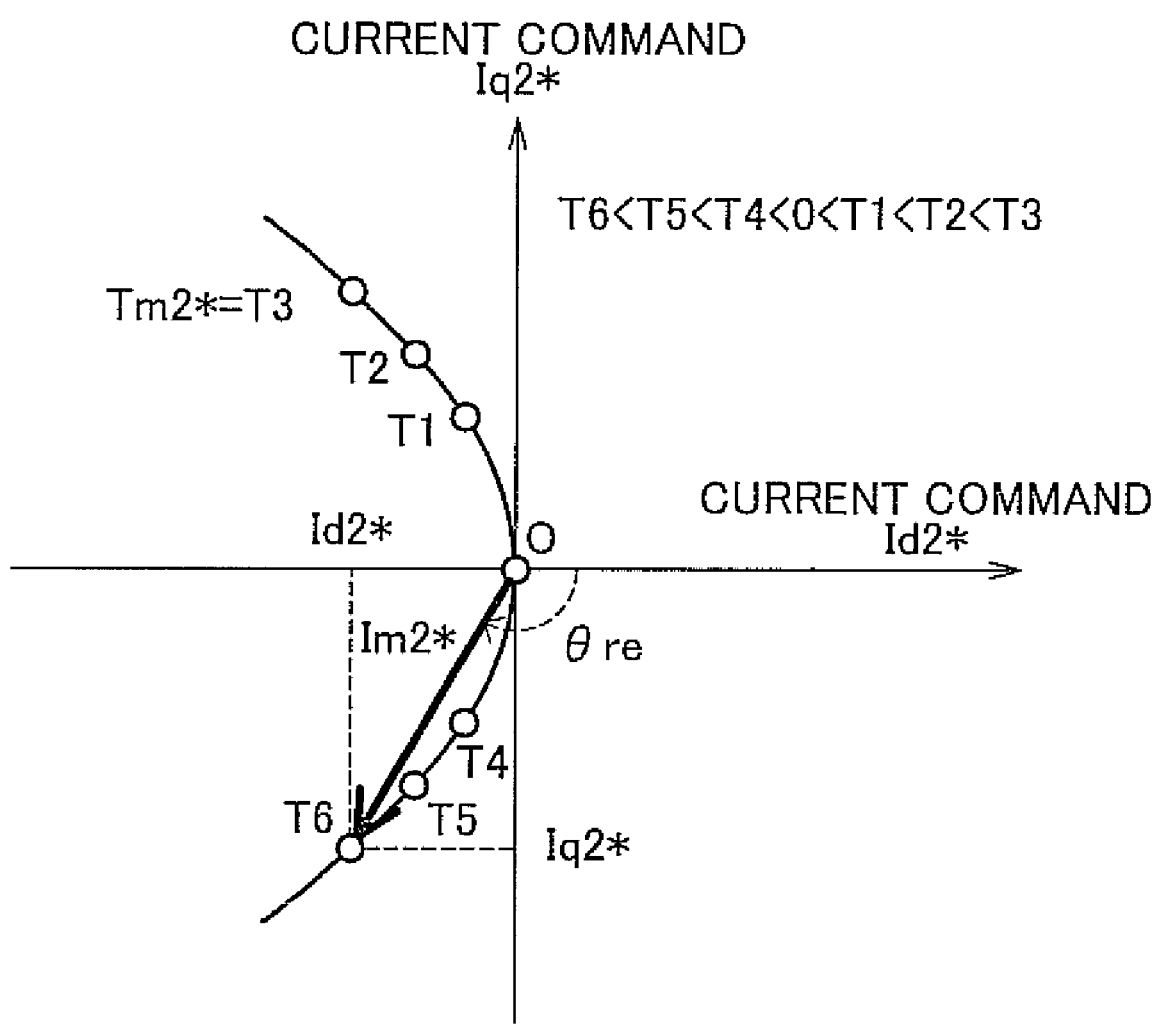
FIG. 13 is an explanatory view showing one example of the relationship between a torque command and d-axis and q-axis current commands, in the power output apparatus of the second embodiment.

FIG. 13 shows one example of the relationship between the torque command Tm2* and the d-axis and q-axis current commands Id2*, Iq2*. In FIG. 13, the manner of setting the d-axis and q-axis current commands Id2*, Iq2* when the torque command Tm2* is equal to torque T6 is illustrated. For the sake of reference, FIG. 13 also shows a current command value Im2* for torque output, and a relative angle $\theta re$ as an angle of the current command value Im2* for torque output relative to the electric angle $\theta e2$* for control set to the electric angle $\theta e2$ of the rotor 46a (i.e., the direction of the stator magnetic field relative to the direction of the magnet-derived magnetic flux, in addition to the torque command Tm2* and the current commands Id2*, Iq2*. By controlling the motor MG2 in this manner, the rate of change dθe2 can be reduced toward value 0. Then, when the rate of change dθe2 becomes equal to or smaller than the threshold value dθref (step S310), step S210 and subsequent steps are executed. Namely, the motor ECU 40 switches to the rotation retardation control as described above.

$$Tm2^* = Kp3(0-d\theta e2) + Ki3\int(0-d\theta e2)dt \tag{8}$$

In the hybrid vehicle 20B of the second embodiment as described above, when the electric angle difference Δθe2 is larger than the lock allowable difference Δθlo, the motor MG2 is controlled by setting the electric angle θe2* for control to the electric angle θe2 of the rotor 46a and setting the torque command Tm2* of the motor MG2 so that the rate of change dθe2 of the electric angle θe2 becomes close to 0. In this manner, the amount or rate of increase in the rotational speed Nm2 of the rotor 46a can be reduced.

In the hybrid vehicle 20B of the second embodiment, when the electric angle difference Δθe2 is larger than the lock allowable difference Δθlo, the motor MG2 is controlled by setting the torque command Tm2* of the motor MG2 according to Equation (8) for feedback control so that the rate of change dθe2 of the electric angle θe2 is reduced toward 0. However, the target value of the feedback control is not limited to 0, but the threshold value dθref or a value somewhat smaller than the threshold value dθref may be used as the target value.

Next, a hybrid vehicle 20C according to a third embodiment of the invention will be described. The hybrid vehicle 20C of the third embodiment has the same hard construction as the hybrid vehicle 20 of the first embodiment as described above with reference to FIG. 1. In order to avoid repeated explanation, the hard construction of the hybrid vehicle 20C of the third embodiment will not be described in detail.

Figure 14A:
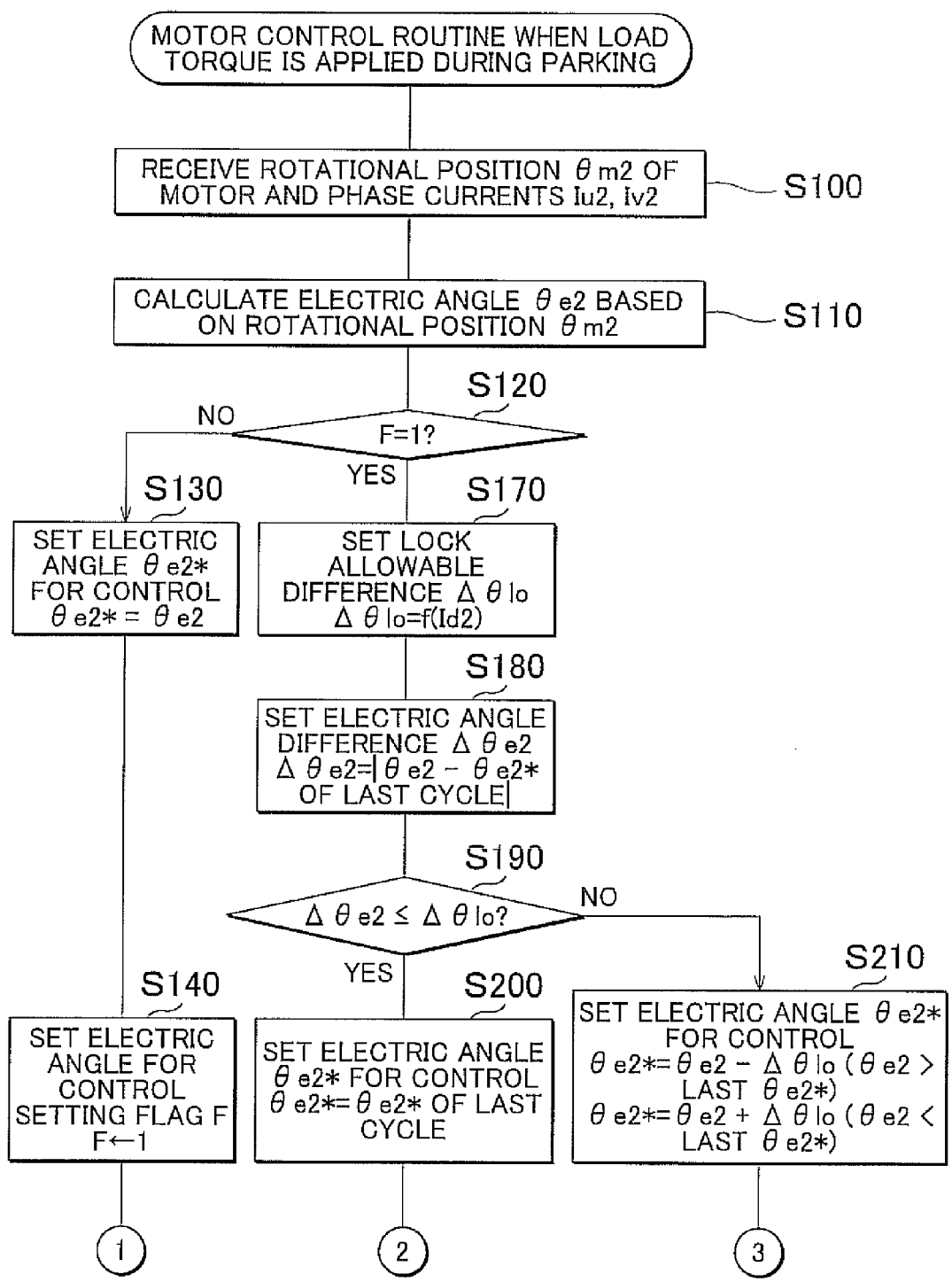

In the hybrid vehicle 20C of the third embodiment, the motor ECU 40 executes a motor control routine of FIGS. 14A and 14B when load torque is applied during parking of the vehicle, in place of the motor control routine of FIGS. 5A and 5B executed when load torque is applied during parking. The motor control routine of FIGS. 14A and 14B is identical with the motor control routine of FIGS. 5A and 5B, except that steps S400-S430 are executed in place of steps S220, S230 after execution of step S210, when the electric angle difference Δθθ is larger than the lock allowable difference Δθlo in step S190. In FIGS. 14A and 14B, the same step numbers as used in FIGS. 5A and 5B are assigned to the same steps.

In the motor control routine of FIGS. 14A and 14B executed when load torque is applied during parking of the vehicle, when the electric angle difference Δθe2 is larger than the lock allowable difference Δθlo in step S190, the electric angle θe2* for control is set according to Equation (6) or (7) as indicated above (step S210), and the phase currents Iu2, Iv2 are subjected to coordinate conversion (3-phase to 2-phase conversion), to be converted into the d-axis and q-axis currents Id2, Iq2 according to Equation (1) in the same manner as in step S220 (step S400). Then, the rate of change dθe2 of the electric angle θe2 is set in the same manner as in step S300 of the routine of FIGS. 12A and 12B of the second embodiment (step S410), and a target maximum lock torque Tlomax* is set according to Equation (9) below for feedback control, so that the rate of change dθe2 set in step S410 becomes equal to a target rate of change dθe2* (so that the rotational speed Nm2 of the rotor 46a corresponding to the rate of change dθe2 becomes equal to a target rotational speed Nm2* corresponding to the target rate of change dθe2*) (step S420). Then, the d-axis current command Id2* is set to a current corresponding to the target maximum lock torque Tlomax set in step S420, while the q-axis current command Iq2* is set to 0 (step S430), and step S240 and subsequent steps are executed.

The target rate of change dθe2* may be determined in advance by experiment, or the like, as a rate of change dθe2 at which the electric angle θe2 changes so that a length of time for which current continuously passes through each phase of the motor MG2 and inverter 42 falls within a range in which the motor MG2 and the inverter 42 can be thermally protected. As the target rate of change dθe2*, a fixed value (e.g., a value equivalent to 100 rpm or 150 rpm) may be used, or a value that increases with increase in the current passing through the d axis (d-axis current command of the last cycle (Id2* of the last cycle)) may be used. In Equation (9), "Kp4" is a gain of the proportional term, and "Ki4" is a gain of the integral term. Since the electric angle θe2* for control is set according to Equation (6) or Equation (7) in the current cycle, the lock torque Tlo is equal to the maximum lock torque Tlomax. Accordingly, the motor MG2 is controlled by setting the d-axis current command Id2* to a current corresponding to the target maximum lock torque Tlomax*, so that the rate of change dθe2 becomes equal to or close to the target rate of change dθe2*. Since the motor MG2 is controlled with the electric angle θe2 for control held constant when the lock control is executed, current passing through a particular phase of the three-phase control of the motor MG2 and a particular switching device(s) of the inverter 42 is likely to increase and generate heat. In this embodiment, however, the rate of change dθe2 is set equal to or around the target rate of change dθe2*, so that the electric angle θe2* for control changes in accordance with the thus set rate of change dθe2. Therefore, current is prevented from continuously passing through a particular phase of the motor MG2 and inverter 42 for some length of time, and an otherwise possible increase in the temperature of the motor MG2 and inverter 42 can be suppressed or curbed. In this case, the amount or rate of increase in the rotational speed Nm2 of the rotor 46a can also be reduced.

$$Tlo\max^* = Kp4(d\theta e2^* - d\theta e2) + Ki4\int(d\theta e2^* - d\theta e2)dt \tag{9}$$

In the hybrid vehicle 20C of the third embodiment as described above, when the electric angle difference Δθe2 is larger than the lock allowable difference Δθlo, the motor MG2 is controlled by setting the d-axis current command Id2*, using the electric angle θe2* set according to the direction of rotation of the rotor 46a, electric angle difference Δθe2 and the lock allowable difference Δθlo, so that the rate of change dθe2 of the electric angle θe2 becomes equal to or close to the target rate of change dθe2 with which the motor MG2 and inverter 42 can be thermally protected. Therefore, the amount of increase in the temperature of the motor MG2 and inverter 42 can be reduced, and the amount of increase in the rotational speed Nm2 of the rotor 46a can be reduced.

In the hybrid vehicle 20C of the third embodiment, when the electric angle difference Δθe2 is larger than the lock allowable difference Δθlo, the motor MG2 is controlled so that the rate of change dθe2 of the electric angle θe2 becomes equal to or close to the target rate of change dθe2* with which the motor MG2 and the inverter 42 can be thermally protected. However, when the motor MG2 or the inverter 42 is placed in a certain condition, as well as when the electric angle difference Δθe2 is larger than the lock allowable difference Δθlo, the motor MG2 may be controlled so that the rate of change dθe2 of the electric angle θe2 becomes equal to or close to the target rate of change dθe2* with which the motor MG2 and the inverter 42 can be thermally protected. The above-mentioned "certain condition" may be, for example, a condition where the temperature of the motor MG2 or inverter 42 is higher than a specified temperature (for example, a temperature somewhat lower than the allowable temperature). In this manner, the amount of increase in the temperature of the motor MG2 or the inverter 42 can be reduced.

In the hybrid vehicle 20C of the third embodiment, when the electric angle difference Δθe2 is larger than the lock allowable difference Δθlo, the motor MG2 is controlled so that the rate of change dθe2 of the electric angle θe2 becomes equal to or close to the target rate of change dθe2* with which the motor MG2 and the inverter 42 can be thermally protected. However, if the rate of change dθe2 of the electric angle θe2 of the rotor 46a is to be controlled to be close to 0, a value equal to or close to 0 may be used as the target rate dθe2* of change. In the hybrid vehicle 20B of the second embodiment, when the electric angle difference Δθe2 is larger than the lock allowable difference Δθlo, the motor MG2 is controlled by setting the torque command Tm2* of the motor MG2 so that the rate of change dθe2 of the electric angle θe2 of the rotor 46a becomes close to 0. However, the motor MG2 may be controlled by setting the torque command Tm2* of the motor MG2 so as to provide a certain rotational speed (for example, the target rate of change dθe2* of the third embodiment).

While the electric angle θe2* for control is set using the electric angle θe2 when the electric angle difference Δθe is larger than the lock allowable difference Δθlo in the hybrid vehicles 20, 20B, 20C of the first, second and third embodiments, the electric angle θe2* for control may be set using an estimated electric angle θe2est as an electric angle of the rotor 46a to be reached when the motor MG2 is controlled (i.e., an estimated value of the electric angle of the rotor 46a for use in control), instead of the electric angle θe2. The estimated electric angle θe2est may be calculated by setting the rate of change dθe2 of the electric angle θe2 of the rotor 46a in the same manner as in step S300 of the routine of FIGS. 12A and 12B of the second embodiment, and adding a value obtained by multiplying the rate of change dθe2 by a constant km2, to the electric angle θe2 of the rotor 46a. The constant km2 may be determined in advance by experiment, or the like, in view of a delay in sensing by the rotational position sensor 44, a delay in computation by the motor ECU 40, and the like, or may be set to value 1. In the illustrated embodiments, the electric angle θe2 is calculated using the rotational position θm2 detected by the rotational position sensor 44, and is used for control of the motor MG2 (setting of the electric angle θe2* for control); therefore, the electric angle θe2 used for control may be different from the actual electric angle θe2 while the rotor 46a is rotating, due to a delay in communications or a delay in computation. On the other hand, the estimated electric angle θe2est is obtained by correcting the electric angle θe2 in terms of those delays in communications, computation and control. Accordingly, the motor MG2 can be more appropriately controlled by setting the electric angle θe2* for control, using the estimated electric angle θe2est.

While the motor MG2 is controlled using the 3-phase to 2-phase conversion and the 2-phase to 3-phase conversion in the hybrid vehicles 20, 20B, 20C of the first, second and third embodiments, the motor MG2 may be controlled without using the 3-phase to 2-phase conversion and the 2-phase to 3-phase conversion.

While the transmission 60 that can be shifted into four gear positions is used in the hybrid vehicles 20, 20B, 20C of the first, second and third embodiments, the number of gear positions is not limited to four, but other types of transmissions may be employed provided that it can be shifted into two or more gear positions. Also, the transmission may be replaced by a mechanism having a clutch, or the like, provided that the mechanism is able to connect the ring gear shaft 32a as the power shaft with the driveshaft 36 or disconnect the ring gear shaft 32a from the driveshaft 36.

While each of the hybrid vehicles 20, 20B, 20C of the first, second and third embodiments includes the engine 22 and the motor MG1 as the power source, the hybrid vehicle may include only the engine, or only the motor, as a power source.

The invention is not limitedly applied to the hybrid vehicles as described above, but may be in the form of a power output apparatus installed on a mobile unit, such as a vehicle other than an automobile, ship or an airplane, or in the form of a power output apparatus incorporated in a stationary facility or equipment, such as construction equipment. The invention may also be in the form of a method of controlling such a power output apparatus.

In the illustrated embodiments, a combination of the engine 22, motor MG1 and the power distribution/integration mechanism 30 is one example of "power source". The motor MG2 constructed as a synchronous motor-generator having the rotor 46a in which permanent magnets are embedded and the stator 46b around which the three-phase coil is wound is one example of "electric motor". The transmission 60 is one example of "connecting and disconnecting means". The motor ECU 40 that executes the motor control routine of FIGS. 5A and 5B when load torque is applied during parking is one example of "controller". When torque is applied from the engine 22 and the motor MG1 to the ring gear shaft 32a while the ring gear shaft 32a as the power shaft and the driveshaft 36 are disconnected from each other by the transmission 60, the motor ECU 40 as the controller executes lock control for controlling the motor MG2, using a constant electric angle θe2* for control, so that rotation of the rotor 46a is restricted or inhibited within a range in which the electric angle difference Δθe2 is equal to or smaller than the lock allowable difference Δθlo. When the electric angle difference Δθe2 becomes larger than the lock allowable difference Δθlo during execution of the lock control, the motor ECU 40 as the controller controls the motor MG2, using the electric angle θe2* for control set according to the direction of rotation of the rotor 46a, electric angle difference Δθe2 and the lock allowable difference Δθlo.

The motor ECU 40 that executes step S110 of the motor control routine of FIGS. 5A and 5B for setting the electric angle θe2 of the rotor 46a based on the rotational position θm2 of the rotor 46a detected by the rotational position sensor 44 is one example of "electric angle detecting unit". The motor ECU 40 that sets an estimated electric angle θe2est as an electric angle of the rotor 46a for use in control of the motor MG2, based on the set electric angle θe2, (i.e., an estimated value of the electric angle of the rotor 46a during control) is one example of "estimated electric angle setting unit". The motor ECU 40 that sets the electric angle θe2* for control, using the electric angle θe2 or the estimated electric angle θe2est, is one example of "controller". The engine 22 is one example of "internal combustion engine", and the motor MG1 is one example of "generator", while the power distribution/integration mechanism 30 is one example of "three-shaft-type power input/output device".

The "power source" is not limited to the combination of the engine 22, motor MG1 and the power distribution/integration mechanism 30, but may be in any form provided that it delivers power to the power shaft. The "electric motor" is not limited to the motor MG2 constructed as the synchronous motor-generator having the rotor 46a in which permanent magnets are embedded and the stator 46b around which the three-phase coil is wound, but may be in any form provided that its rotor is connected to the power shaft, and the rotor is rotated or driven by a rotating magnetic field of the stator so as to deliver and receive power to and from the power shaft. The "connecting and disconnecting device" is not limited to the transmission 60. More specifically, the "connecting and disconnecting device" is not limited to the transmission 60 that can be shifted into four gear positions, but may be a transmission that can be shifted into two or more gear positions, or may be a clutch, provided than it is arranged to connect the power shaft and the driveshaft with each other and disconnect these shafts from each other.

The "controller" is not limited to a single, electronic control unit, but may consist of two or more electronic control units. Also, the "controller" is not limited to the one which executes lock control for controlling the MG2, using a constant electric angle $\theta e2^*$ for control, so that rotation of the rotor 46a is restricted or inhibited within a range in which the electric angle difference $\Delta\theta e2^*$ is equal to or smaller than the lock allowable difference $\Delta\theta lo$, when torque is applied from the engine 22 and the motor MG1 to the ring gear shaft 32a while the ring gear shaft 32a as the power shaft is disconnected from the driveshaft 36 by the transmission 60, and which controls the motor MG2 using the electric angle $\theta e2^*$ for control set according to the direction of rotation of the rotor 46a, electric angle difference $\Delta\theta e2$ and the lock allowable difference $\Delta\theta lo$, when the electric angle difference $\Delta\theta e2^*$ becomes larger than the lock allowable difference $\Delta\theta lo$ during execution of the lock control. Rather, the "controller" may control the motor MG2 by setting the d-axis current command $Id2^*$ such that the d-axis current command $Id2^*$ increases with increase in the electric angle difference $\Delta\theta e2$. Also, the "controller" may control the motor MG2 by setting the d-axis current command $Id2^*$ to a current value corresponding to the electric angle difference $\Delta\theta e2$ when the energization time tcon as a length of time for which the current corresponding to the electric angle difference $\Delta\theta e2$ continuously passes through the motor MG2 is equal to or shorter than the allowable time tad, and setting the d-axis current command $Id2^*$ to a given current I1 when the energization time tcon exceeds the allowable time tad. The "controller" may also control the motor MG2 by setting the d-axis current command $Id2^*$ such that the current command $Id2^*$ increases as the absolute value of the load torque Tr increases.

Also, the "controller" may control the motor MG2 by setting the d-axis current command $Id2^*$ to a current value that is larger when the electric angle difference $\Delta\theta e2$ is larger than the lock allowable difference $\Delta\theta lo$, than that of the case where the electric angle difference $\Delta\theta e2$ is equal to or smaller than the lock allowable difference $\Delta\theta lo$. The "controller" may also control the engine 22 and the motor MG1 so that the magnitude of the load torque Tr is smaller when the electric angle difference $\Delta\theta e2$ is larger than the lock allowable difference $\Delta\theta lo$, than that of the case where the electric angle difference $\Delta\theta e2$ is equal to or smaller than the lock allowable difference $\Delta\theta lo$. Also, the "controller" may control the motor MG2 by setting the electric angle $\theta e2^*$ for control to the electric angle $\theta e2$ of the rotor 46a when the electric angle difference $\Delta\theta e2$ is larger than the lock allowable difference $\Delta\theta lo$, and setting the torque command $Tm2^*$ of the motor MG2 so that the rate of change $d\theta e2$ of the electric angle $\theta e2$ becomes equal to or close to value 0. The "controller" may also control the motor MG2, using the electric angle $\theta e2^*$ for control set according to the direction of rotation of the rotor 46a, electric angle difference $\Delta\theta e2$ and the lock allowable difference $\Delta\theta lo$, when the electric angle difference $\Delta\theta e2$ is larger than the lock allowable difference $\Delta\theta lo$, by setting the d-axis current command $Id2^*$ so that the rate of change $d\theta e2$ of the electric angle $\theta e2$ becomes equal to a target rate of change $d\theta e2^*$ with which the motor MG2 and the inverter 42 can be thermally protected. Thus, the "controller" may be configured or programmed in any manner provided that, when driving force is applied from the power source to the power shaft in a condition where the power shaft and the driveshaft are disconnected from each other by the connecting and disconnecting device, lock control is executed so as to control the electric motor by fixing the direction of the stator magnetic field as the magnetic field of the stator and thereby restricting or inhibiting rotation of the rotor, and rotation retardation control is executed when the rotor rotates during the lock control, so as to control the motor by rotating the direction of the stator magnetic field in accordance with rotation of the rotor, and applying driving force from the motor to the power shaft in a direction opposite to that of load driving force as driving force applied from the power source to the power shaft.

The "electric angle detecting unit" is not limited to the one that sets the electric angle $\theta e2$ of the rotor 46a based on the rotational position $\theta m2$ of the rotor 46a detected by the rotational position sensor 44, but may be any means provided that it detects an electric angle of the rotor. The "estimated electric angle setting unit" is not limited to the one that sets the estimated electric angle $\theta e2est$ as the electric angle of the rotor 46a for use in control of the motor MG2, based on the electric angle $\theta e2$, but may be any means provided that it sets an estimated electric angle as an estimated value of the electric angle of the rotor during control, based on the electric angle. The "internal combustion engine" is not limited to the internal combustion engine that produces power with a hydrocarbon-base fuel, such as gasoline or light oil, but may be any type of internal combustion engine, such as a hydrogen engine. The "generator" is not limited to the motor MG1 in the form of a synchronous motor-generator, but may be any type of generator, such as an induction motor, provided that it is able to deliver and receive power. The "three-shaft-type power input/output device" is not limited to the above-described power distribution/integration mechanism 30, but may be any type of device, such as one using a double-pinion type planetary gear mechanism, or a combination of a plurality of planetary gear mechanisms connected to four or more shafts, or a differential gear, or the like, that operates or functions differently from a planetary gear set, provided that the device is connected to three shafts, i.e., the driveshaft, output shaft of the internal combustion engine, and the rotary shaft of the generator, and is arranged to deliver or receive power to or from one of these shafts based on power received from or delivered to the remaining two shafts.

The present invention can be utilized in power output apparatuses, vehicle manufacturing industry, and so forth. While the invention has been described with reference to example embodiments thereof, it is to be understood that the invention is not limited to the example described embodiments or constructions. To the contrary, the invention is intended to cover various modifications and equivalent arrangements. In addition, while the various elements of the example embodiments are shown in various combinations and configurations, which are example, other combinations and configurations, including more, less or only a single element, are also within the scope of the invention.

What is claimed is:

1. A power output apparatus adapted to drive a driveshaft, comprising:
a power source that delivers power to a power shaft;
an electric motor that has a rotor to which permanent magnets are mounted, and to which the power shaft is connected, and a stator that produces a rotating magnetic field, the rotor being rotated by the rotating magnetic field of the stator so that the electric motor delivers and receives power to and from the power shaft;
a connecting and disconnecting device that connects the power shaft and the driveshaft with each other and disconnects the power shaft and the driveshaft from each other; and
a controller that executes lock control for controlling the electric motor by fixing a direction of a stator magnetic field so as to restrict rotation of the rotor, when a first driving force is applied from the power source to the power shaft in a condition where the power shaft and the driveshaft are disconnected from each other by the connecting and disconnecting device and a directional difference as a magnitude of a displacement between the direction of the stator magnetic field and a direction of a magnet-derived magnetic flux formed by the permanent magnets is equal to or smaller than a first predetermined difference, wherein
when the rotor rotates and the directional difference becomes larger than the first predetermined difference during execution of the lock control, the controller executes rotation retardation control for controlling the electric motor by rotating the direction of the stator magnetic field in accordance with rotation of the rotor, so that a second driving force is applied from the electric motor to the power shaft in a direction opposite to that of a load driving force as the first driving force applied from the power source to the power shaft;
the electric motor is a synchronous motor-generator that is controlled using 3-phase to 2-phase conversion and 2-phase to 3-phase conversion; and
the controller sets an electric angle for control to a constant electric angle during execution of the lock control, and sets the electric angle for control based on an electric angle of the rotor and the first predetermined difference during execution of the rotation retardation control, and the controller sets a d-axis current command for a d-axis current obtained through the 3-phase to 2-phase conversion using the set electric angle for control, to a given current, while setting a q-axis current command to value 0, and controls the electric motor based on the set d-axis and q-axis current commands.

2. The power output apparatus according to claim 1, wherein the controller controls the electric motor during execution of the lock control, so that the stator magnetic field formed when the directional difference is equal to or smaller than the first predetermined difference and is larger than a second predetermined difference that is smaller than the first predetermined difference has a greater strength than the stator magnetic field formed when the directional difference is equal to or smaller than the second predetermined difference.

3. The power output apparatus according to claim 2, wherein:
the strength of the stator magnetic field increases as a motor current that passes through the electric motor increases; and
the controller sets a target current to be passed through the electric motor, using a relationship that an allowable time as a length of time for which the motor current is allowed to continuously pass through the electric motor decreases with increase in the motor current, and controls the electric motor using the set target current.

4. The power output apparatus according to claim 1, wherein
when the rotor rotates and a rotational speed of the rotor exceeds a first predetermined rotational speed during execution of the lock control, the controller sets a drive command of the electric motor, sets the electric angle for control to the electric angle of the rotor, sets a d-axis current command and a q-axis current command for d-axis current and q-axis current obtained through the 3-phase to 2-phase conversion using the set electric angle for control, based on the set drive command of the electric motor, and controls the electric motor based on the set d-axis and q-axis current commands.

5. The power output apparatus according to claim 4, wherein the drive command of the electric motor is set so that the rotational speed of the rotor becomes equal to or lower than the first predetermined rotational speed.

6. The power output apparatus according to claim 1, wherein
when the rotor rotates and the directional difference becomes larger than the first predetermined difference during execution of the lock control, the controller controls the electric motor under the rotation retardation control so that the rotational speed of the electric motor becomes equal to a second predetermined rotational speed.

7. The power output apparatus according to claim 6, wherein
when the rotor rotates and the directional difference becomes larger than the first predetermined difference during execution of the lock control and when a temperature of a motor system including the electric motor becomes equal to or higher than a predetermined temperature during execution of the lock control, the controller controls the electric motor under the rotation retardation control so that the rotational speed of the electric motor becomes equal to the second predetermined rotational speed.

8. The power output apparatus according to claim 1, wherein the controller controls the electric motor during execution of the lock control so that the strength of the stator magnetic field increases as the magnitude of the load driving force increases.

9. The power output apparatus according to claim 1, wherein the first predetermined difference is a magnitude of a displacement between the direction of the stator magnetic field when the lock control is executed and the direction of the magnet-derived magnetic flux when an absolute value of the driving force applied from the electric motor to the power shaft is at the maximum.

10. The power output apparatus according to claim 1, wherein the first predetermined difference increases as a current passing through the electric motor increases.

11. The power output apparatus according to claim 1, wherein the controller controls the electric motor during execution of the rotation retardation control so that the direction of the stator magnetic field is displaced by the first predetermined difference from the direction of the magnet-derived magnetic flux.

12. The power output apparatus according to claim 1, further comprising:
an electric angle detecting unit that detects an electric angle of the rotor; and an estimated electric angle setting unit that sets an estimated electric angle as an estimated value of the electric angle of the rotor during control, based on the detected electric angle, wherein the controller sets the electric angle for control, using the detected electric angle or the set estimated electric angle as the electric angle of the rotor, when the rotation retardation control is executed.

13. The power output apparatus according to claim 1, wherein the controller controls the electric motor during execution of the lock control, so that the stator magnetic field formed when there is a possibility that the directional difference becomes larger than the first predetermined difference has a greater strength than that formed when there is no possibility that the directional difference becomes larger than the first predetermined difference.

14. The power output apparatus according to claim 1, wherein the controller controls the electric motor during execution of the lock control so that the strength of the stator magnetic field increases as the directional difference increases.

15. The power output apparatus according to claim 1, wherein the power source comprises an internal combustion engine, a generator operable to generate and receive power, and a three-shaft-type power input/output device that is connected to three shafts comprising the driveshaft, an output shaft of the internal combustion engine, and a rotary shaft of the generator, and delivers and receives power to and from one of the three shafts, based on power received from or delivered to the remaining two shafts.

16. The power output apparatus according to claim 1, wherein when the rotor rotates and the directional difference becomes larger than the first predetermined difference during execution of the lock control, the controller controls the electric motor under the rotation retardation control so that the strength of the stator magnetic field becomes greater than that detected during execution of the lock control, and/or controls the power source so that the load driving force becomes smaller than that detected during execution of the lock control.

17. The power output apparatus according to claim 1, wherein the connecting and disconnecting device comprises a shifting device operable to transmit power while changing a speed ratio between the power shaft and the driveshaft, and to inhibit power from being transmitted between the power shaft and the driveshaft.

18. A vehicle on which the power output apparatus according to claim 1 is installed, and which has an axle coupled to the driveshaft.

19. A method of controlling a power output apparatus which includes a power source that delivers power to a power shaft, an electric motor that has a rotor to which permanent magnets are mounted, and to which the power shaft is connected, and a stator that produces a rotating magnetic field, the electric motor being controlled using 3-phase to 2-phase conversion and 2-phase to 3-phase conversion so that the rotor is rotated by the rotating magnetic field of the stator and the electric motor delivers and receives power to and from the power shaft, and a connecting and disconnecting device that connects the power shaft and a driveshaft with each other and disconnects the power shaft and the driveshaft from each other, comprising the step of:

executing lock control for controlling the electric motor by fixing a direction of a stator magnetic field so as to restrict rotation of the rotor, when a first driving force is applied from the power source to the power shaft in a condition where the power shaft and the driveshaft are disconnected from each other by the connecting and disconnecting device and a directional difference as a magnitude of a displacement between the direction of the stator magnetic field and a direction of a magnet-derived magnetic flux formed by the permanent magnets is equal to or smaller than a first predetermined difference, and executing rotation retardation control for controlling the electric motor by rotating the direction of the stator magnetic field in accordance with rotation of the rotor, so that a second driving force is applied from the electric motor to the power shaft in a direction opposite to that of a load driving force as the first driving force applied from the power source to the power shaft, when the rotor rotates and the directional difference becomes larger than the first predetermined difference during execution of the lock control, wherein in the step, an electric angle for control is set to a constant electric angle during execution of the lock control, and the electric angle for control is set based on an electric angle of the rotor and the first predetermined difference during execution of the rotation retardation control, and a d-axis current command for a d-axis current obtained through the 3-phase to 2-phase conversion using the set electric angle for control is set to a given current, while a q-axis current command is set to value 0, and the electric motor is controlled based on the set d-axis and q-axis current commands.

* * * * *